(12) United States Patent
Monte et al.

(10) Patent No.: US 9,520,637 B2
(45) Date of Patent: Dec. 13, 2016

(54) AGILE DIVERSE POLARIZATION MULTI-FREQUENCY BAND ANTENNA FEED WITH ROTATABLE INTEGRATED DISTRIBUTED TRANSCEIVERS

(71) Applicant: KVH Industries, Inc., Middletown, RI (US)

(72) Inventors: Thomas D. Monte, Homer Glen, IL (US); Bosui Liu, Portsmouth, RI (US)

(73) Assignee: KVH Industries, Inc., Middletown, RI (US)

(*) Notice: Subject to any disclaimer, the term of this patent is extended or adjusted under 35 U.S.C. 154(b) by 142 days.

(21) Appl. No.: 13/974,886

(22) Filed: Aug. 23, 2013

(65) Prior Publication Data

US 2014/0057576 A1 Feb. 27, 2014

Related U.S. Application Data

(60) Provisional application No. 61/693,990, filed on Aug. 28, 2012, provisional application No. 61/693,705, filed on Aug. 27, 2012.

(51) Int. Cl.
*H01Q 1/12* (2006.01)
*H01Q 3/02* (2006.01)
(Continued)

(52) U.S. Cl.
CPC .......... *H01Q 1/125* (2013.01); *H01P 1/161* (2013.01); *H01Q 3/02* (2013.01); *H01Q 5/47* (2015.01);
(Continued)

(58) Field of Classification Search
None
See application file for complete search history.

(56) References Cited

U.S. PATENT DOCUMENTS 3,050,701 A 8/1962 Tang et al.
3,173,145 A 3/1965 Bowman
(Continued)

FOREIGN PATENT DOCUMENTS

EP 0295812 A2 12/1988
EP 1693922 A1 8/2006
(Continued)

OTHER PUBLICATIONS

Beadle, M. et al., "A C/X/Ku-band Dual Polarized Cassegrain Antenna System," *IEEE*, 692-695 (1999).
(Continued)

*Primary Examiner* — Ping Hsieh
*Assistant Examiner* — James Yang
(74) *Attorney, Agent, or Firm* — Hamilton, Brook, Smith & Reynolds, P.C.

(57) ABSTRACT

A compact, agile polarization diversity, multiple frequency band antenna with integrated electronics for terrestrial terminal use in satellite communications systems includes an antenna feed having highly integrated microwave electronics that are mechanically and electromagnetically coupled thereto in a distributed arrangement so that diverse polarization senses having a low axial ratio and electronic switching control of the polarization senses is provided. The arrangement of the integrated distributed transceiver configuration enables the mechanical rotation of the orientation of a first transceiver for skew alignment while a second transceiver remains stationary relative to the antenna feed assembly. The first transceiver can be a high-band transmitter and receiver pair that supports linear polarization senses, and the second transceiver can be a low-band transmitter and receiver pair that supports circular polarization senses. The antenna system presented is highly compact and offers (Continued)

improved polarization performance previously achievable by only larger devices.

20 Claims, 21 Drawing Sheets

(51) Int. Cl.
| | | |
|---|---|---|
| *H04B 1/40* | (2015.01) | |
| *H01P 1/161* | (2006.01) | |
| *H01Q 19/13* | (2006.01) | |
| *H01Q 19/19* | (2006.01) | |
| *H01Q 13/02* | (2006.01) | |
| *H01Q 15/16* | (2006.01) | |
| *H01Q 5/47* | (2015.01) | |
| *H01Q 1/34* | (2006.01) | |

(52) U.S. Cl.
CPC .............. *H01Q 13/02* (2013.01); *H01Q 15/16* (2013.01); *H01Q 19/136* (2013.01); *H01Q 19/193* (2013.01); *H04B 1/40* (2013.01); *H01Q 1/34* (2013.01)

(56) References Cited

U.S. PATENT DOCUMENTS

| | | | |
|---|---|---|---|
| 3,305,870 A | 2/1967 | Potter | |
| 3,569,871 A | 3/1971 | Tomiyasu | |
| 3,623,094 A | 11/1971 | Paine et al. | |
| 3,731,235 A | 5/1973 | Ditullio et al. | |
| 3,918,064 A | 11/1975 | Gustincic | |
| 4,122,446 A | 10/1978 | Hansen | |
| 4,222,017 A | 9/1980 | Foldes | |
| 4,847,574 A | 7/1989 | Gauthier et al. | |
| 5,373,302 A | 12/1994 | Wu | |
| 5,684,495 A | 11/1997 | Dyott et al. | |
| 5,835,057 A | 11/1998 | Van Heyningen | |
| 6,052,099 A | 4/2000 | Imaizumi et al. | |
| 6,329,957 B1 | 12/2001 | Shea et al. | |
| 6,566,976 B2 | 5/2003 | Krishmar-Junker et al. | |
| 6,593,893 B2 | 7/2003 | Hou et al. | |
| 6,714,165 B2 * | 3/2004 | Verstraeten ................... 343/772 | |
| 6,861,998 B2 | 3/2005 | Louzir et al. | |
| 7,102,585 B2 | 9/2006 | Hsiu et al. | |
| 7,129,903 B2 | 10/2006 | Desargant et al. | |
| 7,224,320 B2 | 5/2007 | Cook | |
| 7,443,355 B2 | 10/2008 | Griffiths | |
| 8,120,541 B2 | 2/2012 | Jung et al. | |
| 8,866,564 B2 | 10/2014 | Monte et al. | |
| 9,281,561 B2 | 3/2016 | Monte | |
| 2003/0184486 A1* | 10/2003 | Shafai et al. ................. 343/779 |
| 2005/0046511 A1* | 3/2005 | Stenberg ....................... 333/125 |
| 2007/0080887 A1 | 4/2007 | Ho | |
| 2007/0089142 A1 | 4/2007 | Norin et al. | |
| 2011/0181479 A1 | 7/2011 | Martin et al. | |
| 2013/0201070 A1 | 8/2013 | Parsche | |
| 2013/0342390 A1 | 12/2013 | Cha et al. | |
| 2014/0139386 A1 | 5/2014 | Liu et al. | |

FOREIGN PATENT DOCUMENTS

| | | |
|---|---|---|
| GB | 2194859 A | 3/1988 |
| KR | 101172437 B1 | 8/2012 |
| WO | WO 2010/076336 A1 | 7/2010 |
| WO | WO 2011/099672 A1 | 8/2011 |
| WO | WO 2014/035824 A1 | 3/2014 |

OTHER PUBLICATIONS

Cavalier, M. and Shea D., "Antenna System for Multi-Band Satellite Communications," *IEEE*, 5 pages (1997).

Cavalier, M., "Feed for Simultaneous X-Band and KA-Band Operations on Large Aperture Antennas," *IEEE*, 5 pages (2007).

Cavalier, M., "Marine Stabilized Multiband Satellite Terminal," *IEEE*, 1-3 (2002).

International Search Report and Written Opinion, issued in International Application No. PCT/US2013/056411, "Antenna System with Integrated Distributed Transceivers", Date of Mailing: Jan. 31, 2014.

Invitation to Pay Additional Fees and, Where Applicable, Protest Fees, issued in International Application No. PCT/US2013/056411, "Antenna System with Integrated Distributed Transceivers", Date of Mailing: Dec. 3, 2013.

International Preliminary Report on Patentability, issued in International Application No. PCT/US2013/056411, "Antenna System with Integrated Distributed Transceivers," Date of Mailing: Mar. 12, 2015.

Collins, G.W., "Shaping of Subreflectors in Cassegrainian Antennas for Maximum Aperture Efficiency", IEEE Transaction of Antennas and Propagation, 21:3, May 1973.

Arntdt, F., et al. "Conical Circular Waveguide with Side-Coupled Rectangular Ports Analyzed by a Hybrid Mode-Matching Method of Moment Technique", Microwave Conference, 2005, European, vol. 2, No., p. 4, pp. 4-6, Oct. 2005.

Uher, J., et al. "Waveguide Components for Antenna Feed Systems: Theory and CAD", Artch House Antennas and Propagation Library, 1993, pp. 413-418, Combiner Design Type 3 (Symmetrical Branching Approach).

* cited by examiner

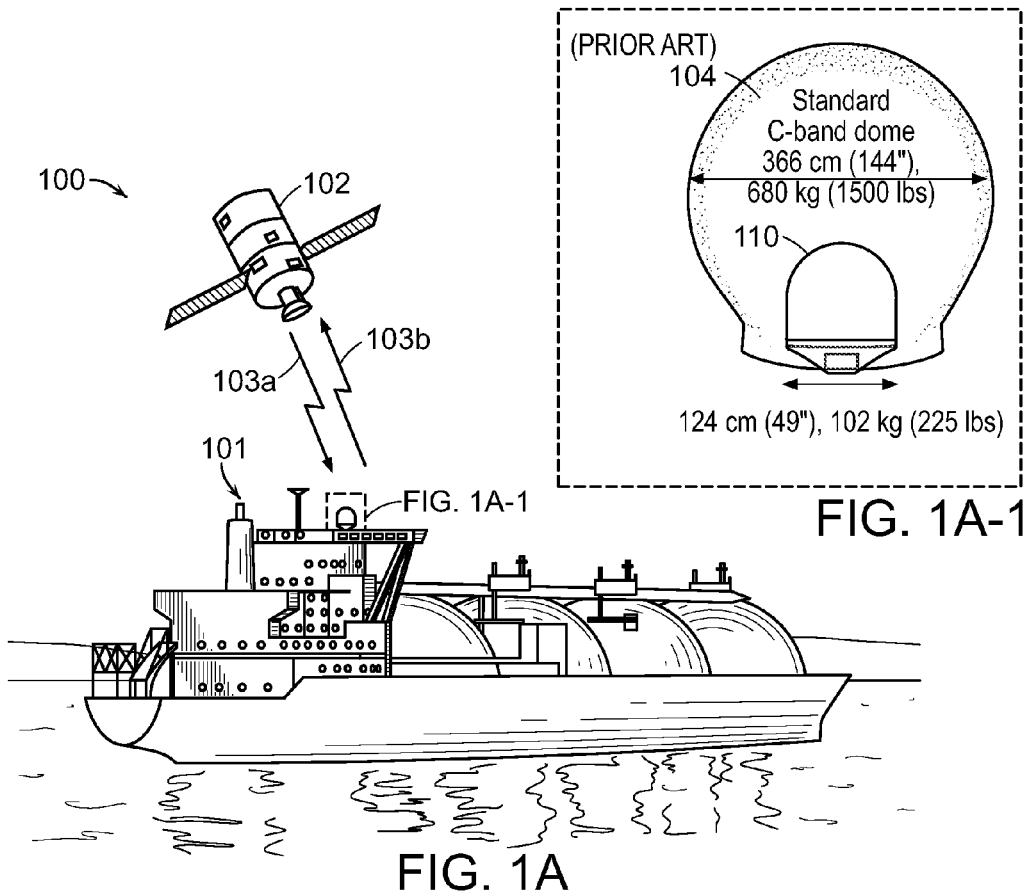
FIG. 1A
FIG. 1A-1
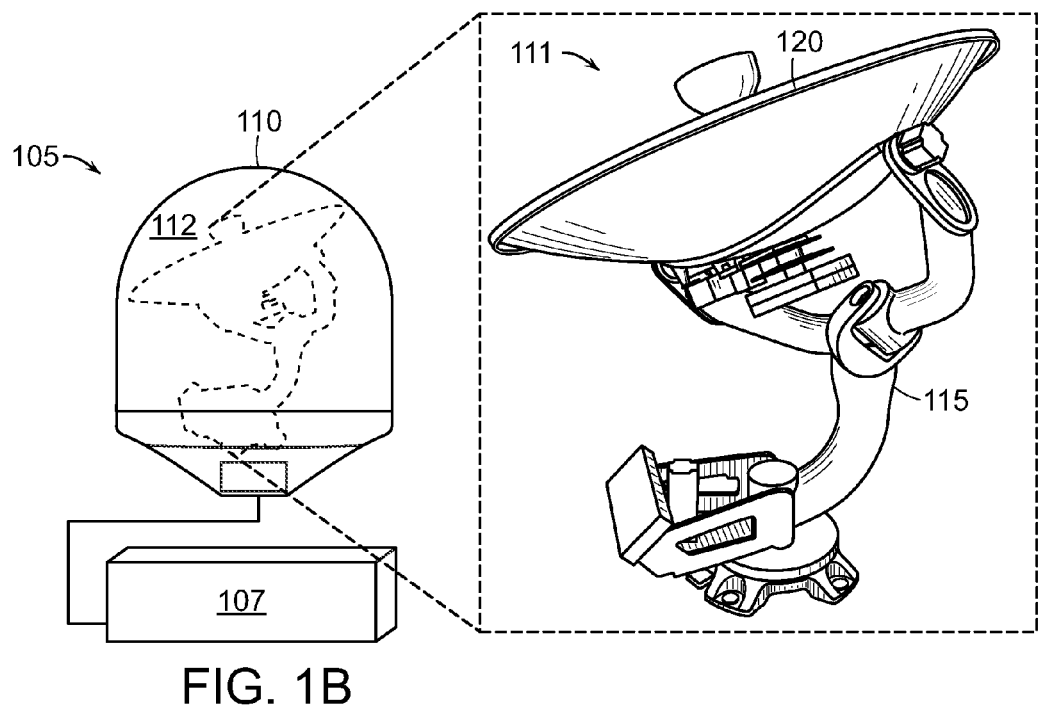
FIG. 1B

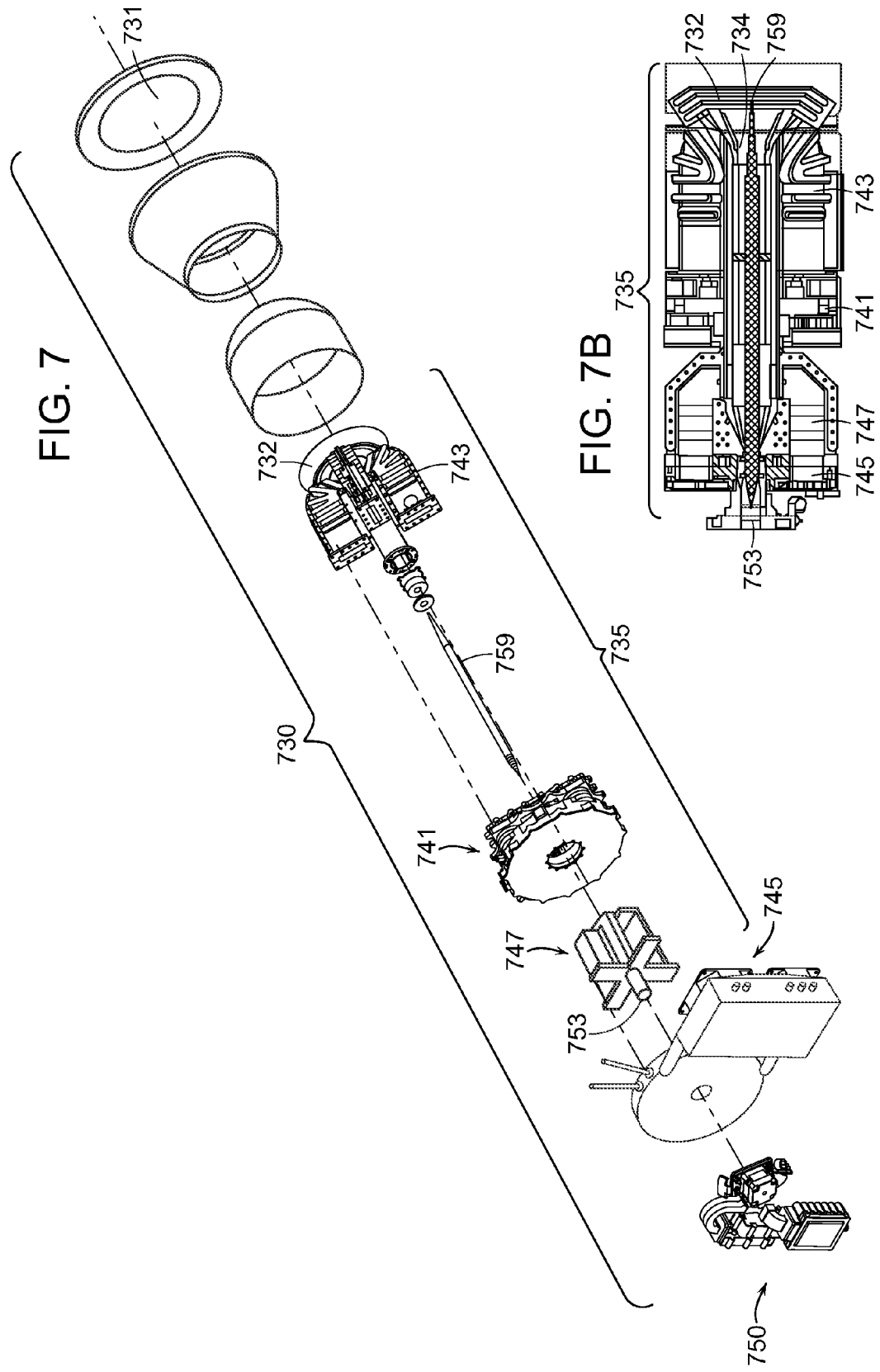

FIG. 16

|  |  | Test Result |  |  |  |  |
|---|---|---|---|---|---|---|
|  | GHz | 14.00 | 14.13 | 14.25 | 14.38 | 14.50 |
|  |  |  |  |  |  |  |
| Gain E-plane | dBi | 41.79 | 42.12 | 42.44 | 42.68 | 41.89 |
| Gain H-plane | dBi | 42.78 | 42.50 | 42.46 | 42.79 | 43.03 |
| avg. Gain/de-embed OMT loss (.2 dB) |  | 42.48 | 42.51 | 42.65 | 42.93 | 42.66 |
| delta, test vs sim | dB | 0.22 | 0.22 | 0.12 | 0.41 | 0.15 |
| Efficiency |  | 71% | 71% | 72% | 75% | 69% |
| Sidelobe |  |  |  |  |  |  |
|     E-plane | deg | 2.03 |  | 2.03 |  | 2.13 |
|  | dB | -13.11 |  | -12.25 |  | -13.13 |
|     H-plane | deg | 2.03 |  | 2.13 |  | 2.13 |
|  | dB | -14.15 |  | -15.70 |  | -13.13 |
| Xpol | dB | -24.50 |  | -26.20 |  | -22.60 |
|  |  |  |  |  |  |  |
|  | GHz | 10.70 | 11.20 | 11.70 | 12.20 | 12.75 |
| Gain E-plane | dBi | 40.14 | 40.27 | 41.74 | 40.92 | 41.67 |
| Gain H-plane | dBi | 40.04 | 39.99 | 40.94 | 40.99 | 41.48 |
| avg. Gain/de-embed OMT loss (.2 dB) |  | 40.29 | 40.33 | 41.54 | 41.15 | 41.77 |
| delta, test vs sim | dB | 0.48 | -0.01 | 0.83 | 0.24 | 0.31 |
| Efficiency |  | 74% | 67% | 82% | 69% | 73% |
|  |  |  |  | ??? |  |  |
| Side lobe   E-plane | deg | 2.83 | 2.73 | 2.53 | 2.33 | 2.43 |
|  | dB | -11.31 | -9.72 | -11.85 | -13.21 | -12.65 |
|     H-plane | deg | 2.73 | 2.83 | 2.53 | 2.33 | 2.33 |
|  | dB | -13.38 | -16.73 | -15.80 | -13.21 | -15.51 |
|  |  |  |  |  |  |  |
|  | GHz | 5.85 | 5.994 | 6.138 | 6.281 | 6.425 |
|  |  |  |  |  |  |  |
| Gain E-plane | dBi | 33.14 | 34.18 | 34.31 | 34.71 | 34.241 |
| Gain H-plane | dBi | 33.56 | 34.42 | 34.386 | 34.54 | 34.472 |
| avg. Gain/de-embed Adptor loss (.33 dB) |  | 33.68 | 34.63 | 34.68 | 34.96 | 34.69 |
| delta, test vs sim | dB | -0.29 | -0.40 | -0.35 | -0.39 | -0.15 |
| Efficiency |  | 54% | 64% | 62% | 63% | 56% |
|  |  |  |  |  |  |  |
| Side lobe   E-plane | deg | 5.23 | 4.97 | 4.77 | 4.73 | 4.77 |
|  | dB | -11.59 | -13.04 | -14.16 | -12.72 | -11.93 |
|     H-plane | deg | 5.27 | 4.87 | 4.93 | 4.63 | 4.83 |
|  | dB | -15.41 | -14.80 | -13.44 | -12.74 | -15.81 |
| Xpol | dB | -21.05 | -19.85 | -20.69 | -26.65 | -21.28 |
|  |  | -18.05 | -19.59 | -17.68 | -18.13 | -22.00 |
|  |  |  |  |  |  |  |
|  | GHz | 3.625 | 3.769 | 3.913 | 4.056 | 4.2 |
| Gain E-plane | dBi | 29.28 | 31.13 | 31.592 | 31.4 | 31.329 |
| Gain H-plane | dBi | 29.42 | 31.09 | 30.956 | 31.14 | 31.551 |
| avg. Gain/de-embed conn. loss (.24 dB) |  | 29.59 | 31.35 | 31.51 | 31.51 | 31.71 |
| delta, test vs sim | dB | -0.42 | 0.39 | -0.07 | -0.12 | -0.26 |
| Efficiency |  | 55% | 76% | 73% | 68% | 67% |
|  |  |  |  |  |  |  |
| Side lobe   E-plane | deg | 7.63 | 7.33 | 7.23 | 7.03 | 7.03 |
|  | dB | -10.97 | -10.29 | -11.62 | -11.78 | -12.80 |
|     H-plane | deg | 7.63 | 7.33 | 7.23 | 7.13 | 6.73 |
|  | dB | -16.13 | -15.85 | -16.71 | -17.03 | -13.95 |

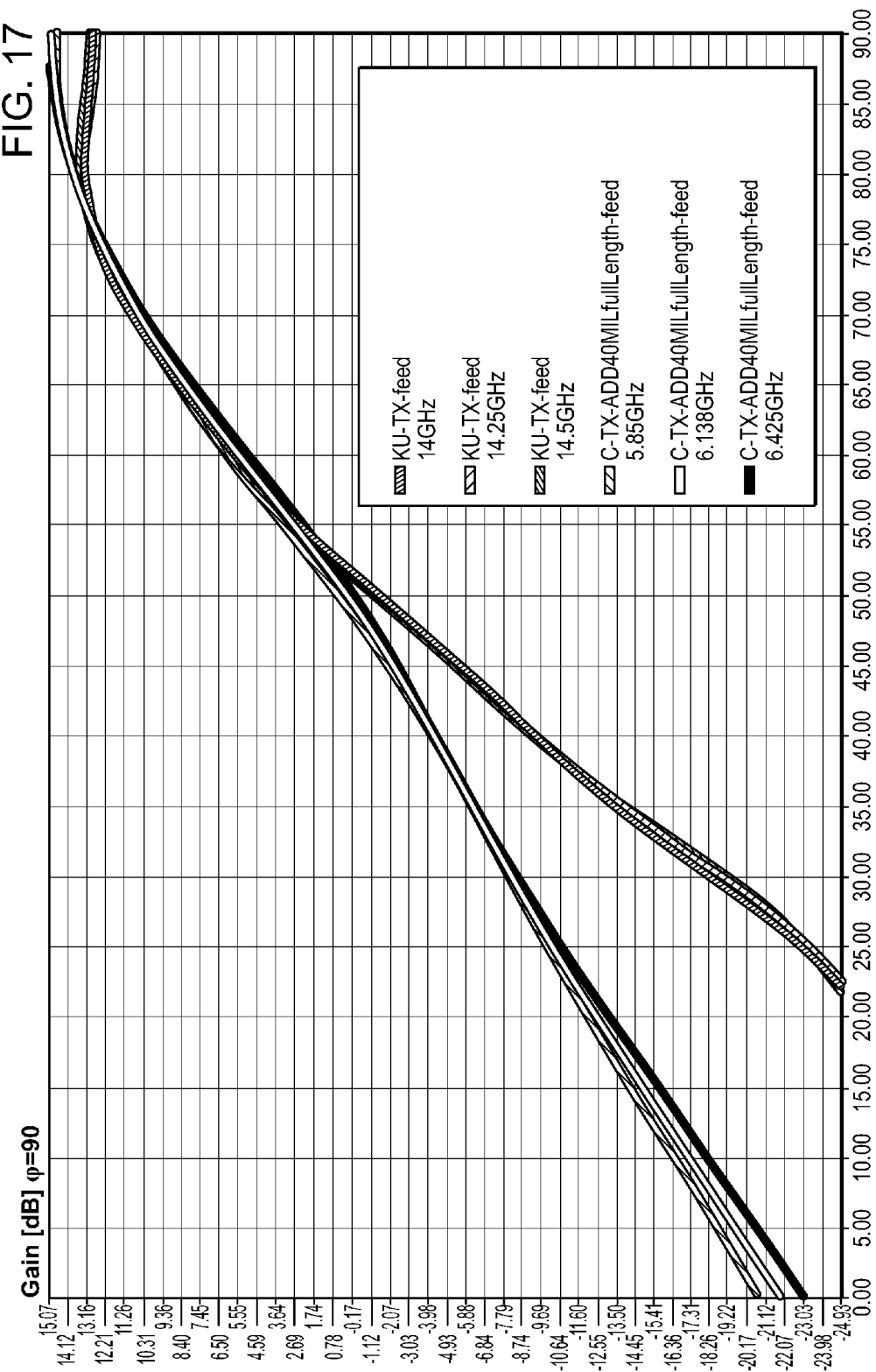

AGILE DIVERSE POLARIZATION MULTI-FREQUENCY BAND ANTENNA FEED WITH ROTATABLE INTEGRATED DISTRIBUTED TRANSCEIVERS

RELATED APPLICATIONS

This application claims the benefit of U.S. Provisional Application No. 61/693,990 filed Aug. 28, 2012 and claims the benefit of U.S. Provisional Application No. 61/693,705 filed Aug. 27, 2012, both entitled "Miniaturized Multi-Band Multi-Frequency Antenna with Agile Polarization Diversity." This application is related to U.S. application Ser. No. 13/473,690, filed on May 17, 2012, entitled "Orthomode Transducer Device," which claims the benefit of U.S. Provisional Application No. 61/596,818, filed on Feb. 9, 2012.

The entire teachings of the above applications are incorporated herein by reference.

BACKGROUND OF THE INVENTION

One of the most common applications of microwave technology today is radio link communications systems. Microwave (or radiofrequency (RF)) communications systems can be used to provide communications links to carry voice, data, or other signals over distances ranging from only a few meters to deep space. At a top level, microwave communications systems can be grouped into one of two types; guided systems or radio links. For guided systems, signals are transmitted over a low loss cable or waveguide. For radio links, radio signals are propagated through space.

One such radio link communications system is a satellite communications system. A satellite communications system includes at least one communications satellite (COMSAT) and one or more terrestrial satellite communications terminals. A communications satellite is a man-made satellite, also referred to as an artificial satellite, which is placed into one of a variety of orbits, for example, geostationary, molniya, elliptical, and low earth, for the purposes of providing telecommunications.

Satellite communications systems can be used to provide a number of services, which at the top level can be classified as providing one of two types of communications services: point-to-point communications services, or broadcast communications services. In general, a communications satellite acts as a microwave radio relay, receiving uplink signals from one terminal and providing a downlink to another terrestrial terminal at a different location. Communications applications which use satellite systems include maritime, vehicular, and aviation applications, in addition to handheld devices and radio and television broadcasting.

Typically, terrestrial satellite communications terminals receive downlink signals from a satellite and, if the terminal is equipped to do so, transmit uplink signals to the satellite.

Important components in any radio link communications systems are antennas. An antenna is a component that converts a wave propagating on a transmission line to a wave propagating in free space (transmission), or a wave propagating in free space to a wave propagating on a transmission line (reception). A wide variety of antenna types and geometries exist, including aperture antennas, reflector antennas, phased array antennas, and combinations thereof.

Antennas are particularly important in satellite communications systems, as can be seen from the Friis power transmission formula:

$$P_r = \frac{P_t G_t G_r \lambda^2}{(4\pi R)^2};$$

where $P_r$ is power received, $P_t$ is power transmitted, $G_r$ is the gain of the receive antenna, $G_t$ is the gain of the transmit antenna, R is the distance between the antennas, $\lambda$ is the wavelength of the signal of interest and it is assumed that the main beams of the antennas are aligned. Further the effective gain, G, of an antenna can be expressed in terms of an effective area, $A_e$:

$$G = \frac{4\pi A_e}{\lambda^2}.$$

The effective area, $A_e$, is directly related to the physical area, A, of an antenna by the antenna efficiency, $\eta_a$, or aperture efficiency: $A_e = \eta_a A$. According to the Friis power transmission formula, the power density received at a receive antenna is inversely proportional to the square of the distance the signal travels from the source. Because satellite communications links are used to communicate over great distances, the gains provided by the antennas are particularly important.

Aperture antennas are often flared sections of waveguide, typically referred to as a horn antenna, or are simply open-ended waveguide. Such antennas are commonly used at microwave frequencies and have moderate antenna gains. Antennas of this type are often used for aircraft and spacecraft applications because they can be conveniently flush mounted on the skin of the vehicle and filled with a dielectric material to provide protection to the aperture from the hazardous conditions of the environment while maintaining the aerodynamic properties of the vehicle.

Reflector antennas are typically used for applications requiring high antenna gain, such as satellite communications system. The high gains provided by reflector antennas are useful for increasing the range of a microwave system. Usually, the high gains provided by such antennas are achieved by focusing the radiation from a small antenna feed onto an electrically larger reflector. An antenna feed is a component of an antenna that couples electromagnetic energy (e.g., microwaves or RF waves) to or from a focusing component of the antenna structure, such as a reflector. In other words, for transmission, an antenna feed guides RF energy from a transmission line to a reflective and directive structure that forms the RF energy from the antenna feed into a beam or other desired radiation pattern for propagation in free space. For reception, the process is reversed. The reflecting structure focuses RF energy to the antenna feed, which collects the incoming RF energy. The RF energy is then propagated along a transmission line to the receiver. Often, the antenna feed is a dipole, feed horn or, simply, even an open-ended waveguide.

Reflector antennas typically include a feed and additional reflective and directive structures, such as a parabolic dish or parasitic elements, whose function is to form the radio waves from the feed into a beam or other desired radiation pattern. Often, reflector antennas are protected from the environment by enclosing them within a radome. A radome is, ideally, an electrically invisible structure that provides protection from the environment for the antenna. If the radome is electrically invisible to the antenna (or approximately transparent), it will not degrade antenna performance significantly. Radomes are typically made from low dielectric hydrophobic materials.

Reflector antennas, of which a parabolic dish antenna is a specific type, are relatively easy to fabricate and are typically quite rugged. However, such antennas can be quite large and unwieldy to move. Because of this, robust mechanical systems are typically needed to steer reflector antennas. The directive beam of a reflector antenna is typically directed along the bore sight axis of the parabolic dish and steered solely by mechanical means used to rotate or otherwise adjust the angular direction of the parabolic dish.

Phased array antennas include multiple stationary antenna elements, typically identical, which are fed coherently and use variable phase or time delay control, or a combination thereof, at each element to scan a directive beam to a given angle in space. Variable amplitude control can also be used to provide beam pattern shaping. Examples of typical phase array antenna elements, also called radiators, include dipoles, microstrip, or patch elements. The primary advantage of the phased array antenna over more traditional antenna types, such as aperture and reflector antennas, is that the directive beam can be repositioned electronically, i.e., scanned electronically. Electronic beam steering can be useful for quickly and accurately redirecting a beam.

Hybrid antennas, such as reflector antennas with a phased array feed, combine useful characteristics of both antenna types, such as the high gain and/or robust design of a reflector antenna, and the agile electronic steering capabilities of the phased array antenna. Although not typically used due to the design costs outweighing the increased performance, a hybrid reflector antenna with a phased array feed can be electronically scanned over a limited angular region.

Polarization is an important characteristic of all electromagnetic waves. Polarization describes the motion through which an electric field vector of an electromagnetic wave points as the electromagnetic wave travels through a point in space. The electric field vector tip can trace a line, circle, or ellipse as the electromagnetic wave passes through the imaginary point in space. In general, these traces are referred to as linear, circular, or elliptical polarization, respectively.

Polarization is important in many applications, and particularly for antennas. The polarization of the antenna is defined by the electromagnetic wave it radiates when the antenna is transmitting. The polarization characteristic of the antenna is important because, for maximum power transfer between radio links, the transmitting and receiving antennas must be of identical matching polarization states at the same time. If the transmitting and receiving antennas are orthogonally polarized, for example, the transmitting antenna is horizontally polarized while the receiving antenna is vertically polarized, then no power would be received. Conversely, if both the transmitting and receiving antennas are horizontally or vertically polarized, then maximum power is received. Because antennas facilitate the transition of electromagnetic energy propagating between free space and a transmission link, polarization is also an important characteristic of all antennas.

Many microwave systems, such as satellite communications systems, rely on waveguide transmission lines for low loss guided propagation of microwave power. Such waveguide systems or networks are typically used as part of an antenna feed. A waveguide, which is typically a rectangular or circular tube with conducting walls, is capable of handling high power microwave signals, but is bulky and expensive. Because waveguides include only a single conductor, they support transverse electric (TE) and transverse magnetic (TM) waves, which are characterized by the presence of longitudinal magnetic or electric field components, respectively. Waveguides are one of the earliest types of transmission lines developed to transport microwave signals and are still used today. Because waveguide technology is mature, there are a large selection of waveguide components, such as splitters/combiners, couplers, detectors, isolators, attenuators, phase shifters, and slotted lines commercially available for various standard waveguide bands from 1 gigahertz (GHz) to over 220 GHz. Due to the recent trend toward miniaturization and integration, many microwave circuits are currently being fabricated using planar transmission lines, such as microstrip and stripline, instead of waveguide. However, the performance required for many high power applications, such as satellite communications systems, and, in particular, antenna feed assemblies for such systems, necessitates the use of waveguides.

For the sake of design simplicity, most waveguide-based transmission line systems support only a single propagating mode, known as the "fundamental" mode. The single fundamental propagating mode is typically the first mode that propagates through the waveguide having a frequency above the cut-off frequency of the waveguide. Waveguides can be characterized as high pass filters as they enable signals above the cut-off frequency to propagate and attenuate all signals below the cut-off frequency. Due to the inverse relationship between wavelength and frequency, higher frequency waveguide components, such as Ku-band systems, have smaller dimensions than lower frequency components, such as C-band systems. In high-power systems, voltage breakdown or arcing can occur when the dielectric (typically air for waveguides) separating conducting walls breaks down. Such arcing is more likely to occur in high-powered, high frequency systems because of the relatively small dimensions and, thus, lower breakdown voltage, between conductors.

Typically, the fundamental mode or another low-order mode, couples well with a free-space radiating beam. In other words, the low-order mode is well matched, and, thus, transfers energy efficiently to free space. In such instances, the propagating mode represents the beam pattern at the feed horn, which illuminates the focusing reflector of a reflector antenna. Generally, the goal is to have a pure single mode at the feed to minimize beam distortion.

SUMMARY OF THE INVENTION

A miniaturized, compact, multi-frequency band antenna having agile polarization diversity and a high antenna efficiency is presented herein. Example embodiments of the antenna system include an antenna feed with integrated electronics in a distributed configuration. Example embodiments of the antenna system can be used for satellite communications, such as the antenna system of a very small aperture terminal (VSAT). The antenna system includes an antenna feed having highly integrated microwave electronics that are mechanically and electromagnetically coupled thereto in a distributed arrangement so that diverse polarization senses having a low axial ratio (or high polarization isolation characteristics) are achieved. The microwave electronics can include multiple transceivers. The multiple transceivers can include transmitter and receiver modules, which can be coupled to the antenna feed in a distributed arrangement. For example, the distributed arrangement can include coupling to receive and transmit ports, or sets of ports, separated by a distance of wavelengths. The antenna feed can be arranged to mechanically rotate the orientation of a first transceiver relative to the second transceiver. Electronic switching control of the polarization sense is provided by example embodiments. The antenna system presented is highly compact and offers improved polarization performance previously achievable by only larger devices.

Dual-reflector antenna designs, antennas having a subreflector and main reflector configuration, are used widely for multiple frequency band antenna applications. One of the advantages of such dual-reflector antennas is provided when a multi-band feed assembly is placed between the main reflector and its focal point to reduce the size of the radome needed to protect the antenna.

Multiple frequency band feed systems traditional include a common path, such as a center waveguide, that is able to support the propagation of all the multi-band signal components. In order to multiplex using such traditional feeds, individual coupling ports, also referred to as irises, are placed at different locations along the center waveguide. Signals within a specific frequency band couple through these ports and are propagated along transmission lines leading to and from transceivers (or a transmitter-receiver pair) traditionally located behind the main dish. In order to reduce attenuation and energy loss along the propagation path, waveguide networks have been traditionally used. The dimensions of the waveguide networks are determined by the frequency of the signals of interest. The lower the frequency, the larger the waveguide cross-section. In order to minimize the waveguide feed line length and reduce the weight and size of the feed assembly, the waveguide feed networks are usually shaped with different bends and twists. Although historically feed networks containing such bends and twist were the most preferred solution, the bends and twists increased manufacturing and system complexity, and degraded system performance from the ideal.

Presented herein, is a multi-frequency band antenna having a miniaturized distributed transceiver module that is integrated with the antenna feed and can include more than one transceiver to support communications links over the multiple frequency bands. In one embodiment, the distributed transceiver module, which can include a low noise block (LNB) receiver module and a solid state power amplifier (SSPA) transmitter module, which are both designed into a short, cylindrical form factor having an opening in the center. The cylindrical-shaped (disk-shaped or ring-shaped) receiver and transmitter modules can be integrated with the feed assembly in front of a main dish. The center opening of such modules allows a pass-through arrangement of a common waveguide feed and allows the common waveguide feed to propagate signals unimpeded through the modules.

In some example embodiments, each transmitter and receiver module has four waveguide coupling ports arranged orthogonally that mate to the coupling ports on the common center waveguide directly, which minimizes attenuation and signal loss. Put another way, each transmitter and receiver pair is coupled to the antenna feed using an orthomode transducer (OMT). The LNB module amplifies received satellite signals to a high level such that additional signal loss by inexpensive cables between the receiver and modem do not degrade the quality of the received signals. Furthermore, the SSPA amplifies the uplink signal to a high power level, suitable for satellite communications, and couples directly into the waveguide ports. Thus, only a couple of SMA cables need be used to connect the individual LNB and SSPA modules to transmit the signals to the back of the dish; no lengthy waveguide feed lines having complicated bends and twists are needed. The transmitter and receiver module locations proximal to coupling ports along the center waveguide obviate a waveguide feed network. The result is a highly-compact and lightweight feed module, which, for C/Ku-bands, has a 9.2 inch diameter, compared to a 17 inch diameter for a feed assembly for traditional C-band-only dual reflector antennas. With such a smaller feed assembly, a compact C/Ku antenna with a dish diameter of 42.3 inches, a radome size of 48 inches, and an antenna efficiency of about 60-75% is achieved. When compared to traditional C-band dual reflector antennas which have a 17 inch feed assembly and an antenna dish diameter of 106.3 inches, the size reduction of the example embodiment is substantial.

Example embodiments of the invention described herein may be designed for the C-band and Ku-band applications, but, as will be understood by those of skill in the art, other embodiments may be used for applications at many other frequency bands and combinations of frequency bands.

In some embodiments, a C-band receiving module (C-band LNA circuit) is integrated at the output of the C-band receiving waveguide multiplexer (or combiner) directly, which minimizes insertion loss and improves system gain over temperature (G/T) performance.

The example integrated C-band receiving module has a center opening to allow higher frequency signals, such as C-band transmitting signals and Ku-band signals, to pass through unimpeded. Further, the C-band receive module is arranged between the main reflector and the feed horn.

The integrated C-band receiving module may incorporate a polarization network at the front end to enable switchable inputs for right-hand circular polarized (RHCP) or left-hand circular polarized (LHCP) signals.

The example integrated C-band receive module, located in front of the main reflector, is arranged to stay behind the low-frequency (i.e., C-band receive frequency band) waveguide combiner and subreflector. This arrangement provides for minimum antenna efficiency degradation.

In some embodiments, a C-band transmitting circuit including power amplifier circuit, is integrated directly at the input of the C-band transmitting waveguide combiner. This arrangement reduces losses between the power amplifier circuit and antenna feed, allows for lower power amplification, obviates a bulky waveguide feed line, and reduces system complexity and cost.

The example integrated C-band transmitting module has a disk-shape with a center opening to allow higher frequency components, such as Ku-band signals to pass through.

The example integrated C-band transmitting module incorporates a polarization network to enable switchable outputs of RHCP or LHCP signals.

Example polarization networks in both the C-band transmitting and receiving circuits are independently selectable, enabling great system flexibility.

The polarization networks in both the C-band transmitting and receiving circuits also use matched termination to terminate the idling port when the polarization sense in not in use. This design improves the polarization performance of the network.

The integrated C-band transmitting circuit utilizes the metal structure of the entire feed to dissipate heat, which reduces the required size of additional heat dissipation hardware, such as cooling fans, heat-sinks, heat-pipes and/or any combination thereof.

C-band multiplexer/combiner, feed horn, and C-band integrated electronics are fixed into position without rotation about the center axis of the reflector antenna. By incorporating a circular waveguide rotary union (or joint), in one embodiment, only the Ku-band combiner rotates to align the linear signal polarization to the satellite (also known as skew alignment).

The relatively large C-band waveguide combiners and transceiver modules, located in front of the main reflector, stay inside the "shadow" of the sub-reflector, minimizing additional blockage of the antenna aperture. This configuration enables a highly integrated feed network and antenna horn. It further enables the overall feed system to be much more compact than other dual-band VSAT systems, thus minimizing the impact on antenna efficiency, and reduces the weight, cost, and complexity of the entire antenna while enhancing the system performance at the same time.

In an example embodiment of a stabilized antenna systems using a compact feed as disclosed herein, the larger and heavier C-band portion of the multiband feed network remains fixed near the vertex of the reflector and the weight center (i.e., center of inertia) of the system providing easier balancing of and movement in the azimuth and elevation rotation of the stabilized antenna, enabling reduction in power and weight motors employed to steer the antenna.

In one embodiment, a centralized switch and control module connects to the integrated C-band receiving and transmitting modules and the Ku-band transceiver to provide control signals, DC power, signal switching, and signal-level control. This arrangement delivers a unified and seamless interface to an external modem, thereby reducing the system complexity for installation and operation. The Ku-band transceiver may be mounted at the end of the entire feed system in an example embodiment. The Ku-band transceiver provides the Ku VSAT operation capability for an example antenna.

The example centralized switch and control module connects to the integrated C-band receiving and transmitting modules, and Ku-band transceiver. The centralized switch and control provides DC power, reference signals, control signals, intermediate frequency (IF) signals, and/or radio frequency (RF) signal to the C-band receiving and transmitting modules and the Ku-band transceiver.

In some embodiments, the centralized switch and control module provides switching between C-band and Ku-band VSAT operation. It delivers a simple and unified interface to the external modem and reduces system complexity for installation. In some embodiments, the centralized switch and control module enables simultaneous operations, i.e., simultaneous reception and transmission, at either the C-band or Ku-band. Furthermore, it will be recognized by those of skill in the art that, some embodiments, for example, embodiments including two modems or dual-band modem, enable simultaneous reception and transmission at both C-band and Ku-band when paired with a satellite capable of simultaneous C-band and Ku-band operation.

The centralized switch and control module may provide intermediate frequency (IF) signal level control to enable various IF cable lengths for various system installations.

The centralized switch and control module may also perform frequency up conversion for C-band transmit signal. This arrangement reduces the weight of the integrated C-band transmitting module.

In an example embodiment including a centralized switch and control module, switching between C-band and Ku-band VSAT operation may be provided. A centralized switch and control module may provide a simple and unified interface to the modem and reduces system complexity for installation. The centralized switch and control module also may provide an intermediate frequency (IF) signal level control to enable various embodiments.

In some embodiments, a compact, dual-polarized, multi-band, waveguide combiner (also referred to herein as a multiplexer) with integrated electronics for use in satellite communications antenna systems is presented. The waveguide combiner (or multiplexer) provides dual-polarized signal filtering of three (or fewer or more) separate frequency bands. For the two lowest frequency bands in some example embodiments, highly integrated microwave electronics are coupled to the waveguide combiner device to generate the desired polarization sense with improved polarization performance and electronic switching control of the polarization sense. This multiband combiner design is highly compact and offers improved polarization performance previously achievable only by larger waveguide devices.

In an example embodiment, a dual-polarized waveguide combiner provides signal filtering of three (or fewer or more) separate frequency bands: (i) C-band Receive 3.600 to 4.200 GHz; (ii) C-band Transmit 5.850 to 6.425 GHz; and, (iii) Ku-band Receive (11.700 to 12.700 GHz) and Ku-band Transmit (14.000 to 14.500 GHz) band 11.700 to 14.500 GHz.

In some example embodiments, the waveguide combiner includes a common port that propagates all frequency bands with two orthogonal polarizations. A first set of four waveguide paths with coupling irises are attached to the common dual-polarized waveguide to couple the lowest frequency band signals. A second set of four waveguide paths with coupling irises are attached to a reduced-size of the dual-polarized waveguide to couple the intermediate frequency bands signals. A further reduced size, dual-polarized back (or rear) port propagates the highest frequency band signals.

The first set of phase-matched low loss waveguide paths may integrate in a single plane in order to facilitate the connections to a microstrip line printed circuit board (PCB) network. In such an embodiment, signal splitting and phase delays required to receive the desired state of polarization are included the PCB networks. In the case of the receive waveguides, the transmit rejection filter is integrated into waveguide "sweeping arms" to minimize the combiner size. Each of the four receive waveguide paths of the corresponding waveguide sweeping arms include identical waveguide path and coupling structures to the receive microstrip network PCB interfaces. The four receive waveguide sweeping arms interface in a plane in one embodiment. Optionally, each of the four receive waveguide paths include 90 degree waveguide bends. The symmetrical and opposing waveguides defining the waveguide paths (e.g., the waveguide sweeping arms) may bend in opposing directions. Alternatively, the symmetrical and opposing waveguides may bend in similar directions. A PCB with a microstrip or stripline network interfaces to the waveguide interface plane. The receive band microstrip combiner may provide amplitude and phase relationships to receive circularly polarized signals.

The second set of phase-matched, low loss, waveguide paths of an example embodiment integrates in a single plane in order to facilitate the connections to a microstrip or stripline PCB network. The signal splitting and phase delays required to produce the desired state of polarization may be included in the PCB networks. Each of the four transmit waveguide paths include identical waveguide path and coupling structures to the transmit microstrip network PCB interfaces. The four transmit waveguide arms interface in a plane. Optionally, each of the four transmit waveguide paths include 90° waveguide bends. Alternatively, the symmetrical and opposing waveguides bend in opposing directions.

The symmetrical and opposing waveguides bend in similar directions. A PCB with a microstrip or stripline network interfaces to the waveguide plane. The transmit band microstrip combiner may provide the necessary amplitude and phase relationships to create circularly polarized signals. A symmetrical low loss waveguide provides a dual-polarized signal path through the waveguide combiner body for the highest frequency band. In one configuration, a low loss, circular, dielectric rod is used to propagate the highest frequency band signals through the combiner. In this case, dual polarized Ku-band signals propagate through the dielectric rod within the C-band, dual polarized, metallic waveguide.

Other frequency band combinations are feasible; for example, an example embodiment can be configured to be used for a C-band and Ka-band multiband system, X-band and Ka band multiband system, Ku-band and Ka-band multiband system, or the like.

Electronic polarization switching may be included in the PCB networks. The C-band transmit and/or receive PCB networks include a means to switch electronically between the circular polarization, RHCP, and LHCP. Other embodiments are configured to support linear polarization.

The C-band transmit and receive PCB networks provide a matched termination to reflected signals of the opposite polarization sense, thereby improving the overall antenna polarization performance.

An example embodiment is applicable as a dual-band, dual-polarized, waveguide combiner providing signal filtering for separate frequency bands, for example, C-band Receive 3.625 to 4.200 GHz and C-band Transmit 5.850 to 6.425 GHz.

In embodiments of the present invention, a miniaturized polarization agile and diverse multi-frequency VSAT antenna is achieved and thereby reduces the physical size of the antenna. Generally, such miniaturization is enabled through a reduction in the size of the antenna feed and waveguide assembly in conjunction with the distribution and integration of the multi-frequency transceiver modules. More particularly, the low frequency band receivers and transmitters are miniaturized and integrated with the antenna feed. The low frequency transceiver can include a receiver module and a transmitter module. The receiver module and transmitter module both have a form factor of a short cylindrical shape with an opening in the center. In other words, they may be disk-shaped, ring-shaped, or washer-shaped. The cylindrically shaped modules can be integrated into a feed assembly in front of the main dish, and the center opening of the modules allows the feed assembly's common waveguide to propagate signals through to higher frequency transceivers. In an example embodiment, each receiver and transmitter module has four coupling ports that couple to the center waveguide feed and meet to planar coupling ports on the modules. The short waveguide paths that couple from coupling irises located on the center waveguide path via waveguides to the planar interface ports along the transceiver modules minimizes signal attenuation along this embodiment. An embodiment avoids the use of a lengthy complicated waveguide feed lines containing typical bends and twists. Due to the fact that a complicated waveguide feed line is obviated in order to bring the signal to the rear of the rear-fed reflector, a compact and lightweight feed assembly results. In an example embodiment, the C-band and Ku-band feed module is about 9.2 inches in diameter and feeds a C-band and Ku-band antenna parabolic dish with diameter of 42.3 inches. The antenna efficiency of this example embodiment is about 75%±8% for Ku-band and 65%±11% for C-band, or more or less, depending on system performance budgets.

In one embodiment, an antenna feed assembly includes a feed horn, set of phase matched RF paths, receiver module mounted to the feed horn and coupled to the RF paths and a subreflector. The feed horn is configured to propagate multiple radio frequency (RF) bands with primary radiation patterns having substantially the same beam width for at least two RF bands of the multiple RF bands. The two RF bands may be RF transmitting bands. The set of phase matched RF paths are operative over an RF band of the multiple RF bands, electromagnetically coupled to the feed horn and configured to propagate electromagnetic energy of corresponding polarizations in an orthogonal arrangement around the feed horn. The receiver module may be monitored to the feed horn and mechanically and electromagnetically coupled to the set of RF paths. The subreflector may have a lateral cross-section of the same dimension or larger than a corresponding lateral cross-section of the feed horn and mounted receiver module. The receiver module may include an electric phase shifter operative to adjust a phase length or phase angle (or setting) of electromagnetic energy received via the set of phase matched RF paths. The electronic phase shifter of the receiver module may control switching between receiving electromagnetic signals having a right hand circular polarization (RHCP) sense and a left hand circular polarization (LHCP) sense independently of a transmitter function of a transmitter module. The set of phase matched RF paths can be a first set of phase matched RF paths and the RF band can be a first RF band. The antenna feed assembly may further include a second set of phase matched RF paths operative over a second RF band of the multiple RF bands and may be electromagnetically coupled to the feed horn and configured in an orthogonal arrangement around the feed horn. The antenna feed assembly may further include a transmitter module mounted to the feed horn and mechanically and electromagnetically coupled to the second set of RF paths. The transmitter module may include an electronic phase shifter operative to adjust a phase length or phase angle (or setting) of electromagnetic energy to be transmitted via the second set of phase matched RF paths. The electronic phase shifter of the transmitter module may be configured to control switching between transmitting electromagnetic signals having a RHCP sense and a LHCP sense independently of a received function of the receiver module.

In another example embodiment, an antenna assembly including an antenna feed assembly and first and second transceivers mechanically and electromagnetically coupled to respective receive and transmit ports of the antenna feed assembly. The antenna feed assembly is arranged to rotate mechanically an orientation of the first transceiver relative to the orientation of the second transceiver. The first and second transceivers operate over first and second RF bands, respectively. The first RF band may include a range of Ku-band frequencies. The second RF band may include a range of C-band frequencies. Bands with the same or other frequencies are also contemplated to be within the scope of this and other embodiments. The antenna assembly may also include a main reflector arranged in a stationary orientation relative to the second transceiver. The antenna assembly may also include a subreflector configured to reflect electromagnetic energy propagating between the antenna feed assembly and the main reflector. The subreflector creates an RF shadow region or blockage region. In some example embodiments, the second transceiver is at least partially located within the RF shadow region. Alternatively, or additionally the second transceiver is arranged such that a cross-section of the second transceiver can be entirely located within the region created by the subreflector. The first transceiver may be arranged to rotate to enable linear polarization alignment with a paired antenna distal from the antenna assembly, also known as skew alignment. The antenna assembly can further include transmit and receive planar coupling interfaces. The second transceiver can be mounted to the antenna feed assembly such that coupling between the transmit and receive ports of the second transceiver and corresponding transmit and receive ports of the antenna feed assembly occurs at the transmit and receive planar coupling interfaces, respectively. The antenna assembly may further include a subreflector configured to reflect electromagnetic energy propagating between the antenna feed assembly and the main reflector, the subreflector creating RF shadow region (electromagnetic blockage region) from a far-field perspective between the subreflector and the main reflector. The transmit and receive planar coupling interfaces can be located within the RF shadow and have lateral dimensions that do not protrude from the RF shadow region.

An example method of the present invention includes a method of transitioning propagating microwave energy between a transmission line and free-space using an antenna assembly, the method includes propagating microwave energy using an antenna feed assembly, coupling the propagating microwave energy to first and second transceivers mechanically and electromagnetically coupled to respective receive and transmit ports of the antenna feed assembly, and rotating mechanically an orientation of the first transceiver relative to the second transceiver. The propagating microwave energy can be over first and second RF bands, the first and second RF bands being the operational bands or within the operational bands of interest of the first and second transceivers, respectively. The propagating microwave energy of the first RF band can be comprised of a range of substantially Ku-band frequencies and the propagating microwave energy of the second RF band can be comprised of a range of substantially C-band frequencies. The example method can further include facilitating the propagating microwave energy of the first RF band within the antenna feed assembly through the use of a dielectric rod. The example method can further include maintaining a stationary orientation of a main reflector relative to the second transceiver. The example method can further include reflecting electromagnetic energy propagating between the antenna feed assembly and the main reflector using a subreflector, the subreflector creating an RF shadow region, and transmitting or receiving using the second transceiver, the second transceiver being at least partially located within the RF shadow region. The transmitting or receiving is performed by a transmitter and receiver, respectively, composing the second transceiving the second transceiver having a lateral cross-section entirely located within the RF shadow region. The rotating mechanically the orientation of the first transceiver can further include rotating the first transceiver to enable linear polarization alignment with a paired antenna distal from the antenna assembly. The coupling of the propagating microwave energy to the second transceivers can be performed at the transmit and receive ports of the second transceiver and corresponding respective transmit and receive ports of the antenna feed assembly at transmit and receive a planar coupling interfaces. The example method can further include reflecting electromagnetic energy propagating between the antenna feed assembly and the main reflector using a subreflector, the subreflector creating an RF shadow region, and transmitting and receiving using the second transceivers the transmit and receive planar coupling interfaces being located in the RF shadow region and having maximum lateral dimensions no greater than corresponding lateral dimension of the RF shadow region.

An example embodiment of an antenna feed assembly can include means for propagating microwave energy to feed an antenna assembly, means for coupling the propagating microwave energy to first and second transceivers having means for mechanically and electromagnetically coupling to respective receive and transmit ports of the antenna feed assembly, and means for mechanically rotating an orientation of the first transceiver relative to the second transceiver.

Yet another example embodiment includes an antenna assembly including a feed horn assembly having symmetry about an axis of propagation, a set of RF propagation paths, and a distributed receiver coupled mechanically and electromagnetically to the set of RF propagation paths at a set of receive ports. The set of RF propagation paths may be electromagnetically coupled to the feed horn assembly and configured to propagate electromagnetic energy of an RF band parallel to the axis of propagation. The antenna assembly may further include a receiver subcircuit of the distributed receiver, the receiver subcircuit can be arranged to shift electronically a phase of electromagnetic energy received at the set of receive ports. The set of RF propagation paths may be further configured in an orthogonal arrangement around the axis of symmetry of the feed horn assembly. The receiver subcircuit of the distributed receiver may enable electronic switching between electromagnetic energy having a right hand circular polarization (RHCP) sense and a left hand circular polarization (LHCP) sense. The antenna assembly may further include a main reflector and a subreflector, where the subreflector is configured to reflect electromagnetic energy propagating between the antenna feed assembly and the main reflector, the subreflector creating an RF shadow region. The distributed receiver and set of RF propagation paths may be located within the RF shadow region and have respective lateral cross-sections that do not exceed a lateral cross-section of the RF shadow region. In other words, the distributed receiver and set of RF paths, in one embodiment, do not protrude from the RF shadow on the main reflector created by the subreflector. The set of RF propagation paths can be a first set of RF propagation paths, and the RF band can be a first RF band, the antenna assembly may further include a second set of RF propagation paths coupled to the feed horn assembly. The second set of RF propagation paths may be configured to propagate electromagnetic energy of a second RF band parallel to the axis of propagation. The antenna assembly may further include a distributed transmitter circuit coupled mechanically and electromagnetically to the second set of RF propagation paths at a set of transmit ports. A transmitter subcircuit of the distributed transmitter may be arranged to shift electronically phase of electromagnetic energy transmitted at the set of transmit ports. The second set of RF propagation paths may be further configured in an orthogonal arrangement around the axis of symmetry of the feed horn assembly. The transmitter subcircuit may switch electronically between electromagnetic energy having a RHCP sense and a LHCP sense. The transmitter subcircuit may provide polarization switching independently of a receiver polarization state. The antenna assemble can further include a dielectric rod having an axis coincidental with the axis of propagation of the feed horn assembly.

Still another example embodiment includes an antenna feed assembly including phase shifting electronics, mechanically and electromagnetically coupled to ports of the antenna feed assembly, and a controller, operatively coupled to the phase shifting electronics and configured to enable the phase shifting electronics to switch between right hand circular polarization (RHCP) and left hand circular polarization (LHCP) senses. The phase shifting electronics are associated with a transceiver, having a transmitter circuit or module and a receiver circuit or module, and further configured to switch independently transmitter and receiver polarization senses.

A still further example embodiment includes a rear-fed reflector antenna assembly including a feed horn assembly, a coupling structure, and a reflector. The feed horn assembly may include a feed horn, subreflector waveguide assembly, having ports coupled to the feed horn, and microwave circuits electromagnetically coupled to the ports via a coupling structure. The reflector may be electronically coupled to the feed assembly in a rear feed arrangement in which at least a subset of the microwave circuits are located between the subreflector and the reflector. The microwave circuits may include transmitter and receiver circuits. In this example embodiment, the feed horn is configured to propagate RF signals at multiple RF bands with primary radiation patterns having substantially the same beam width for two (or more) of the RF transmission bands. Put another way, the feed horn may be configured such that the antenna pattern has substantially the same beamwidth for multiple frequency bands, e.g., beam widths within about 2 dB of each other for about 35° off of bore sight.

Yet another example embodiment includes a rear-fed reflector antenna assembly including a main reflector having a greatest dimension that is between 10 and 20 times greater than the wavelength in a wavelength range of interest and a subreflector arranged to reflect electromagnetic energy propagating between the main reflector and an antenna feed assembly mechanically coupled to the main reflector and a pass through arrangement, the subreflector optionally having a greatest dimension based on a minimum antenna efficiency and an RF shadow on the main reflector. The antenna feed assembly may be arranged between the main reflector and the subreflector and have a greatest dimension confined within the electromagnetic shadow. In an example embodiment, the main reflector may have its greatest dimension of about 1 meter. The rear-fed reflector assembly may further include ring-shaped transmitter and receiver modules mounted to the antenna feed assembly the ring-shaped modules being mounted to the exterior of the antenna feed assembly and at least partially between the main reflector and subreflector. The transmitter and receiver module can have respective transmit and receive planar interfaces having respective greatest lateral dimensions that fit within the RF shadow. The wavelength range of interest may be between about 2.07 cm (14.50 GHz) and 8.30 cm (3.60 GHz). This wavelength range of interest includes the C-band transmission frequency band. The antenna feed assembly may have a primary radiation pattern having substantially the same beamwidths (e.g., within about 2 dB for range of angles from bore sight to about 35° off of boresight) for each of the multiple wavelength ranges, including the wavelength range or ranges of interest. The wavelength range of interest may be between about 4.67 cm and 8.30 cm. And, the multiple wavelength ranges of interest may further include a second wavelength range of interest between about 2.07- 2.56 cm (14-14.5 GHz). It should be understood that other frequency bands are within the scope of the present invention.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 1A depicts an example application of an example embodiment of the present invention.

FIG. 1B illustrates a VSAT including an antenna unit and below deck equipment.

FIGS. 7, 7A, and 7B illustrate the assembly of antenna feed and integrated distributed transceiver through an exploded view thereof.

FIG. 16 is a table of recorded antenna performance over various frequency ranges.

FIG. 17 illustrates the antenna gain of an example embodiment at different frequencies.

DETAILED DESCRIPTION OF THE INVENTION

Figure 2:
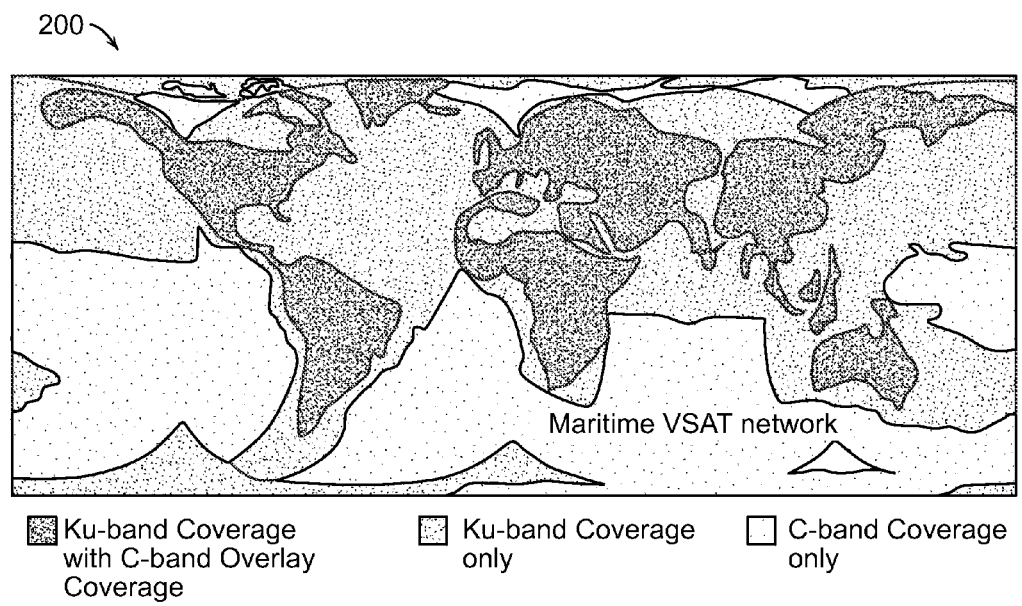
FIG. 2 is a satellite coverage map provided by a dual-frequency VSAT assembly.

A description of example embodiments of the invention follows.

A very small aperture terminal (VSAT) is a two-way (i.e. uplink and downlink) satellite ground station or stabilized mobile terminal, typically with a dish antenna that is smaller than 3 meters (m). VSATs communicate with satellites in geosynchronous orbit to relay data from terminals to other terminals in a mesh topology, or master earth station hubs in a star topology. VSATs are often used with maritime or other mobile platforms.

Traditionally, VSATs are most commonly used to transmit narrowband data. However, with the increased demand for data, including broadband Internet and high definition television, demand for broadband data has increased significantly.

Dual reflector antenna designs, in particular antenna configurations having a main reflector and a subreflector, are widely used in multi-frequency antenna applications to reduce the size of the radome needed. One such application is a VSAT antenna. The radome size can be reduced due to the fact that the multi-frequency feed assembly can be arranged between the main reflector and its focal point, thus reducing the size of the radome needed to provide the antenna structure with environmental protection.

Traditional multiple frequency band antenna feeds typically include a common propagation path, for example, a waveguide along the feed axis. Often, such a waveguide is used to propagate the multiple frequency bands of interest. Typically, individual coupling ports (waveguide irises) are placed at specific locations along the center waveguide. Microwave signals of a specific frequency band couple through these coupling ports and propagate to a feed network, which is typically constructed using a waveguide feed network. Waveguide feed networks are usually shaped with different bends and twists. Waveguide networks are used to reduce the attenuation along the propagation path from the coupling ports to transceivers (or transmitters and/or receivers) because waveguide networks are less than other types of transmission lines of the same length. However, the bends and twists of a waveguide network increase the waveguide feed network complexity and increase undesired propagating modes, and, thus, increase RF energy loss.

A rule of thumb used by antenna designers is that gain is directly proportional to the area of an antenna and indirectly proportional to the square of the wavelength of the frequency to be used. Therefore, traditional C-band dual reflector antennas are designed to be used with parabolic dishes with diameters approximately 2.4 meters (94 inches) or larger. For reflector antennas at C-band, the gain of the antenna reduces quickly for main reflector parabolic dishes having diameters less than 1-2 meters (m). The gain can be significantly reduced further by subreflector and antenna feed blockage. For example, typical C-band dual reflector antennas use a feed assembly with a diameter of approximately 17 inches. Because of the gain required in most systems, traditional C-band antennas are quite large. When used in maritime applications, C-band antennas occupy a significant amount of valuable top deck real-estate. In addition to the lost opportunity costs resulting from the real-estate that C-band antennas consume, traditional C-band antennas also consume more fuel than smaller devices.

A compact multiple frequency band, agile, polarization diverse, antenna feed and integrated distributed transceiver for VSAT systems, according to example embodiments of the present invention, greatly reduces the size of a traditional antenna system. Such a miniaturized antenna feed and integrated distributed transceiver can reduce costs by minimizing weight, associated fuel and lost opportunity costs, while improving operational performance, and minimizing the complexities of a VSAT system installation and operation.

The term multiple frequency bands, multi-frequency bands, multi-frequency and multi-band are used interchangeably throughout the present application to refer to multiple bands or groups of frequencies wherein each band or group of frequencies supports multiple communications channels.

The term transceiver is used throughout the present application to refer to a transmitter and receiver pair or pairs that operate to enable communications over a common communications link (e.g., both up-link and down-link frequency bands). A transmitter and receiver pair may be combined to share common circuitry and may share a common housing. Alternatively, the transmitter and receiver of a receiver pair each may be housed in a respective transmitter and receiver module and share only limited common circuitry, such as a common transmission or reception path (e.g., an antenna feed), or may share no circuitry at all.

As used throughout the present application, the term reflector is used to refer to a device or structure that reflects electromagnetic waves. The term reflector is used to generally refer to the main or primary reflector, while the term sub-reflector is used generally refer to a secondary reflector (typically smaller).

As used throughout the present application, the term circuit board may refer to a printed circuit board (PCB), flexible or non-flexible, or a hybrid thereof (e.g., a combination of flexible and non-flexible circuit boards), single or multi-layer circuit boards, single or multiple integrated circuits (ICs), also known as chips, and can have a two-dimensional or three-dimensional architecture.

As used throughout the present application, the term integrated generally means to have formed, coordinated, or blended into a functioning or unified whole, to incorporate into a larger unit, and more specifically, with reference to an antenna feed assembly with integrated transceivers, means that the transceivers are tightly coupled (mechanically and electromagnetically) to the antenna feed assembly. For example, the integrated transceivers are directly mounted to (direct physical connection) the antenna feed assembly.

An example embodiment of a compact multi-frequency agile polarization diversity antenna assembly includes a main reflector, subreflector, and antenna feed in a feed through arrangement with the main feed to couple of electromagnetic energy between the antenna feed assembly and the subreflector and main reflector, creating a shadow region or blockage area between the subreflector and main reflector wherein the antenna feed is located. An example embodiment of the antenna feed assembly includes a feed horn, a waveguide assembly including orthomode transducers, integrated transceivers. The two transceivers can include a high band transceiver and a low band transceiver. The high band transceiver can be rotated mechanically, relative to the antenna assembly including the low band transceiver in order to facilitate skew alignment (i.e., to line up the high band transceiver with the polarization of a prospective communication link antenna). The low band transceiver can be a distributed transceiver including separate transmitter and receiver modules. The transmitter and receiver modules for the low band transceiver can be coupled to the antenna feed assembly using OMTs. The OMTs can couple electromagnetic energy over a received and transmit low bands, from irises long sweeping waveguide arms coupled to a the respective transmitter and receiver modules in at a planar interface. In other words, the receiver module can interface with the OMT in at a planar interface so that the ports of the receiver module mate with the ports of the OMT in a quadrature arrangement in a single plane. Such a quadrature arrangement in a single plane facilitates circular polarization because the lengths of the OMT paths are identical and equal. As will be presented in more detail below. The low band receiver module and low band transmitter module of the low band transceiver are disk or ring shaped enabling the high and RF signals to propagate through the waveguide of the antenna feed assembly to the high band transceiver. The low band transceiver and respective transmitter and receiver modules are arranged along the antenna feed waveguide assembly such that the lateral dimensions (e.g., the diameters) are contained within the shadow region or blockage area of the subreflector between subreflector and the main reflector.

An example embodiment of a compact multi-frequency agile polarization diverse antenna feed can be integrated with multiple transceivers, including a distributed transceiver waveguide includes receiver and transmitter modules arranged along the multi-frequency feed path. The receiver and transmitter modules can be coupled to the waveguide path using respective orthomode transducers (OMTs) having ports arranged in quadrature aligned in a single plane positioned as close as practicable to the signal coupling irises located along the multi-frequency feed path, so that transmission line losses are minimized. In an example embodiment, a set of short waveguide bends with frequency rejecting filters are used to couple the RF signals of interest from the multi-frequency feed path to the receiver and transmitter modules. Each set of short waveguide bands provides an equal length propagation path and four ports in a quadrature arrangement to provide a planar interface to the transmitter and receiver modules, respectively.

An example embodiment of the compact, multi-frequency, agile, polarization diverse, antenna feed and integrated distributed transceiver provides a miniaturized and lightweight feed system. The system performance of an example embodiment is an improvement over traditional VSAT systems in part due to the minimization of insertion loss and phase mismatch. In an example embodiment, the diameter of the antenna feed is less than 8 inches, where the diameter is the lateral cross-section of the antenna feed. Such a small diameter enables a small 42.3 inch reflector main reflector to be used while still maintaining system link budgets. Example embodiments presented work efficiently at C-band and Ku-band.

An example embodiment of the compact, multi-frequency, agile polarization diversity antenna assembly VSAT terminal can support seamlessly both C-band and Ku-band services, which can include CDMA communications, Voice over Internet Protocol (VoIP), Ethernet, Wi-Fi, Internet, etc.

FIG. 1A depicts an example application of an example embodiment of the present invention. A maritime vessel 101 uses a very small aperture terminal (VSAT) 105 (shown in FIG. 1B) to communicate with a satellite 102. The maritime vessel 101 receives a downlink communications 103a and transmits information via an uplink signal 103b to satellite 102 using VSAT 105. Also depicted in FIG. 1A-1 is a traditional C-band radome 104. As shown in FIG. 1A-1, an example embodiment of a which and antenna assembly 110 includes compact, multi-frequency, antenna feed and integrated distributed transceiver, which significantly reduces the antenna dimensions required and, therefore, the dimensions of the radome required.

FIG. 1B shows a VSAT 105 including an antenna unit 110 and below deck equipment 107. The antenna unit 110 includes the antenna assembly 111 and radome 112. The antenna assembly 111 includes a reflector 120 mounted to a mechanical scanning assembly 115. The mechanical scanning assembly 115 further includes motor and control mechanisms (not shown). The mechanical scanning assembly 115 includes three axes of motion, enabling the antenna to provide azimuth, elevation, and cross-azimuth coverage. The mechanical scanning assembly 115, includes gyro-stabilization, robotic, direct-drive motion control and a modular antenna controller for high-speed tracking. The three-axis, gyro-stabilized, pedestal design, mechanical scanning assembly 115 and fourth-axis skew adjustments, as will be presented in more detail below, enables the optimal satellite in the network to be tracked, including directly overhead at the equator and the horizon at polar latitudes.

FIG. 2 depicts today's satellite coverage map 200 for a dual-frequency VSAT assembly. In the example embodiment illustrated, Ku-band coverage with C-band overlay coverage, Ku-band coverage only, and C-band's coverage only, are shown. As can be seen from the coverage map 200, satellite communications coverage for Ku-band and C-band overlay is available over most of the globe, coverage of 95% of the Earth's surface, with exception of the poles.

Figure 3:
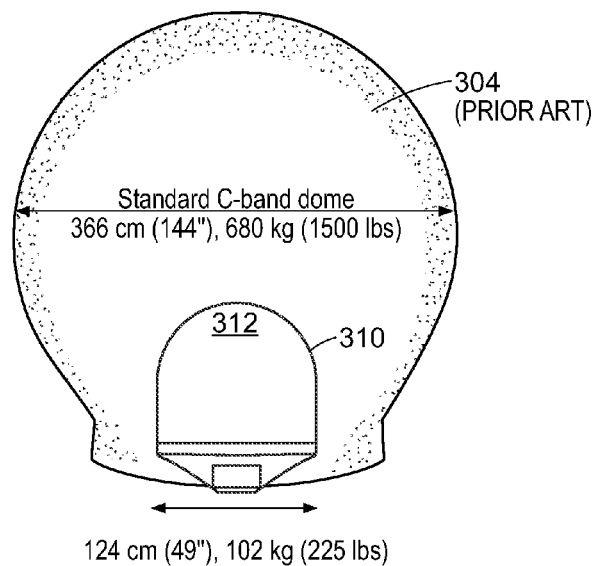
FIG. 3 illustrates a significant reduction in size possible with an example embodiment of the present invention.

FIG. 3 illustrates a significant reduction in size possible with an example embodiment of the present invention. For the example embodiment shown in FIG. 3, a C-band miniaturized antenna feed and distributed integrated transceiver enables the diameter of the radome 312, which is approximately 124 cm (49 inches), to be reduced by about 66% from that of the standard C-band radome 304, which has a diameter of about 366 cm (144 inches). Not only is space and real-estate footprint saved using an embodiment of the present invention, weight savings of roughly 85% can also be achieved (e.g., from a weight of about 680 kg (1500 lbs) for the traditional antenna to a weight of 102 kg (225 lbs) for the example embodiment).

Figure 4A:
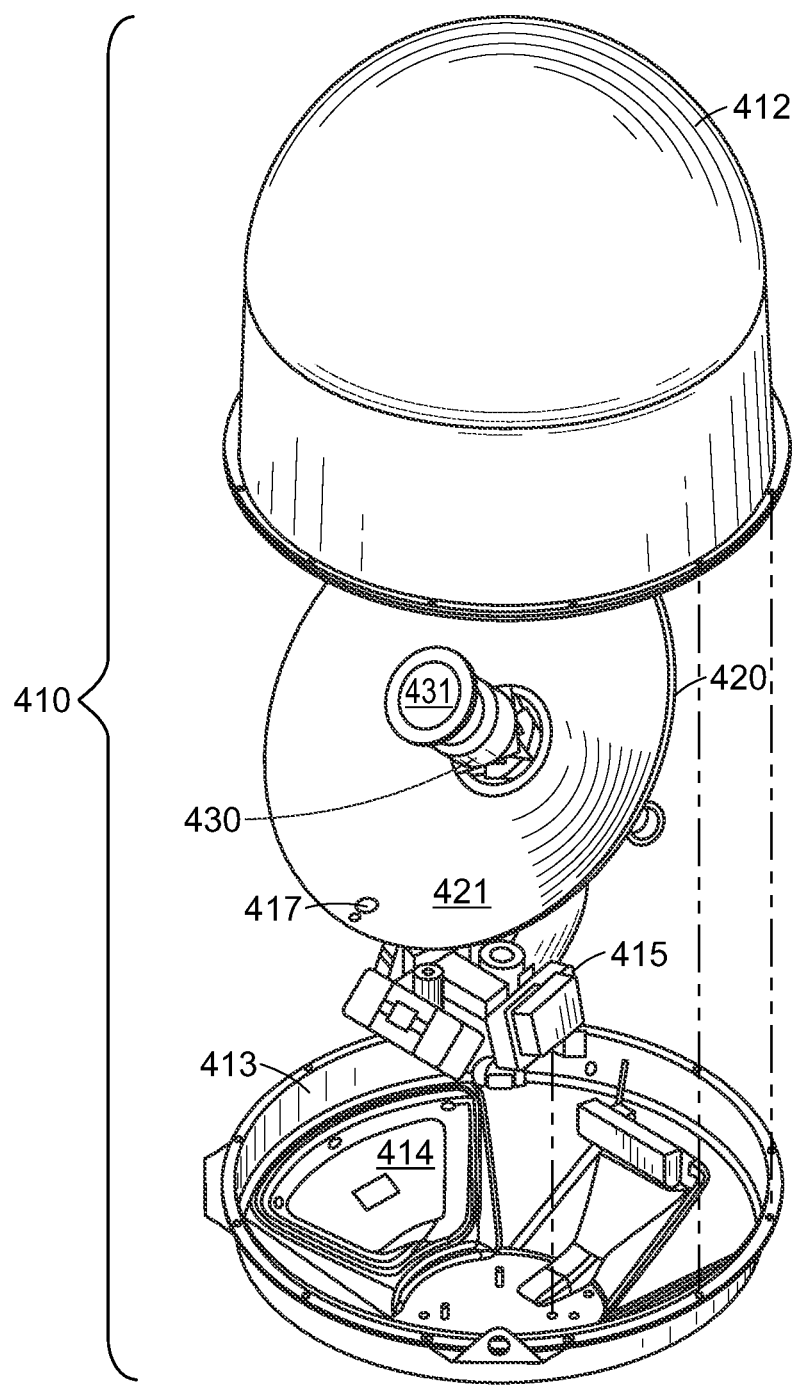
FIG. 4A illustrates an exploded view of an example antenna unit assembly.

FIG. 4A illustrates an exploded view of an example antenna assembly 410. The antenna assembly 410 includes three subassemblies, a radome subassembly, antenna subassembly 420, and a mechanical scanning assembly 415. The radome subassembly includes a radome 412 and base unit 413. The base unit 413 includes a hatch 414, which enables access to the interior for service and maintenance. Mechanical scanning assembly 415 includes support structures, mechanical drive mechanisms (e.g., a robotic direct-drive assembly), and associated controlling electronics (not shown in detail) to scan and control the speed and direction in which the antenna beam is pointing. Antenna subassembly 420 includes reflector 421, miniaturized antenna feed and integrated transceiver assembly 430, subreflector 431, and GPS assembly 417. In the example embodiment of FIG. 4A, reflector 421 is a parabolic dish. Antenna subassembly 420 includes a rear-fed reflector 421 and antenna feed and integrated transceiver assembly 430, which can be seen to be protruding through to the front side of reflector 421. The front side is on the same side as the face of the parabolic dish that reflects RF energy and the side that includes boresight.

Figure 4C:
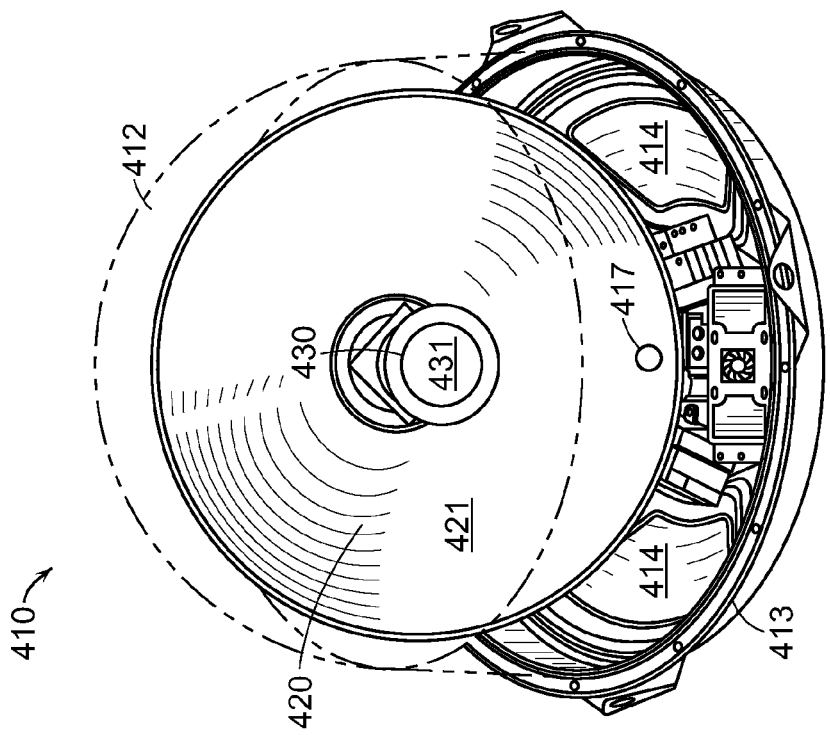
FIGS. 4B and 4C are illustrations of an example antenna assembly showing further detail.
Figure 4B:
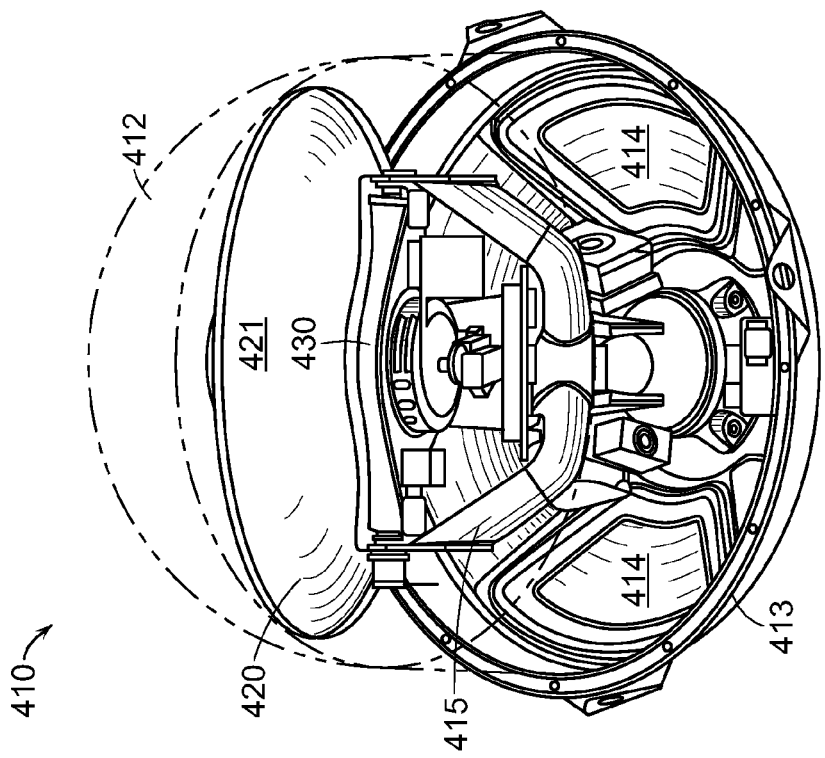

FIGS. 4B and 4C are illustrations of the antenna assembly 410 showing further detail. FIG. 4B illustrates a perspective view of the antenna assembly 410 with boresight, that is the direction in which the antenna beam is pointing, being at a roughly 45 degree angle into the page, away from the viewer. FIG. 4C illustrates a perspective of the antenna assembly 410 with the beam pointing out of the page, towards the viewer at an approximately 30 degree angle. FIG. 4C is a front side view of the antenna assembly 410.

FIG. 4B illustrates a back side view of the antenna assembly 410. The antenna assembly 410 includes an antenna radome subassembly (radome 412 and radome base unit 413), mechanical scanning subassembly 415, and antenna subassembly 420. The back side view of the antenna subassembly 420 further shows main reflector 421, and antenna feed and integrated transceiver assembly 430.

From FIG. 4B and FIG. 4C, it should be clear that the antenna subassembly 410 is a rear-fed reflector, with the antenna feed assembly 430 protruding from the backside of reflector 42. In a preferred example embodiment, the antenna feed assembly 430 is arranged to pass-through the vertex of the parabolic dish main reflector 421 to the front side of the antenna main dish reflector 421. The lateral cross-section dimensions (e.g., diameter) of the antenna feed 430 are smaller than the lateral cross-section dimensions antenna subreflector 431.

To achieve efficient radiation characteristics, a subreflector (or sub-dish), such as a subreflector 431, must be at least a few wavelengths in diameter. However, the presence of the subreflector 431 introduces electromagnetic shadowing onto the main reflector 421. Such shadowing is a principal performance limitation of microwave antennas with subreflectors. Shadowing can significantly degrade the gain of an antenna system, whether caused by the subreflector 431 or antenna feed 430, or a combination thereof. Example embodiments of miniaturized antenna feed and distributed integrated transceiver presented can minimize main reflector shadowing, thereby enabling a smaller main reflector 431 to be used while maintaining antenna gain and efficiency.

Figure 5A:
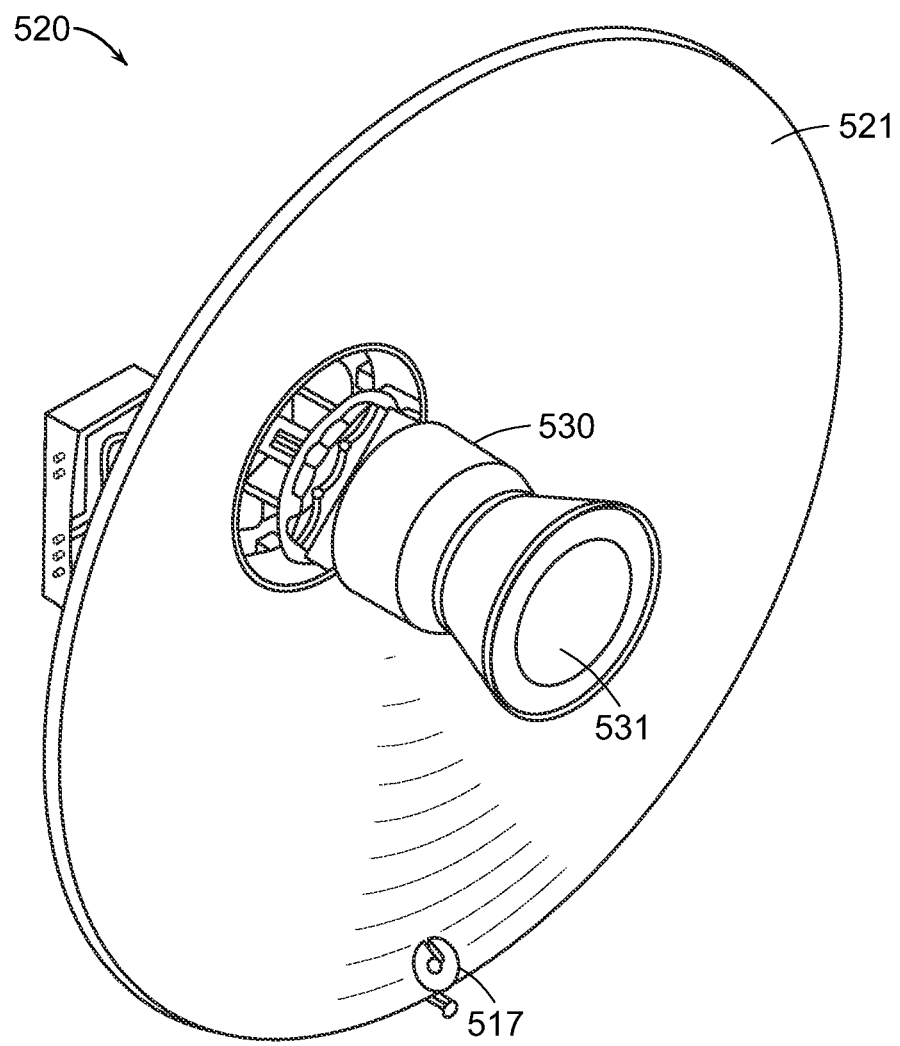
FIGS. 5A-5D are illustrations of an embodiment of a antenna subassembly.

FIG. 5A shows a front perspective view of an example embodiment of an antenna subassembly 520. The antenna subassembly 520 includes shaped parabolic dish 521, which acts as a main reflector, and antenna feed assembly including integrated distributed transceiver assembly 530, subreflector 531, and global positioning system (GPS) assembly 517. The example embodiment of the miniaturized compact multi-frequency agile polarization diversity antenna feed and integrated distributed transceiver assembly 530 is arranged such that it feeds the main reflector, parabolic shaped dish 521, from the rear, via reflections from the subreflector 531. As such, the example embodiment of antenna assembly 520 is a rear-fed reflector antenna.

Figure 5B:
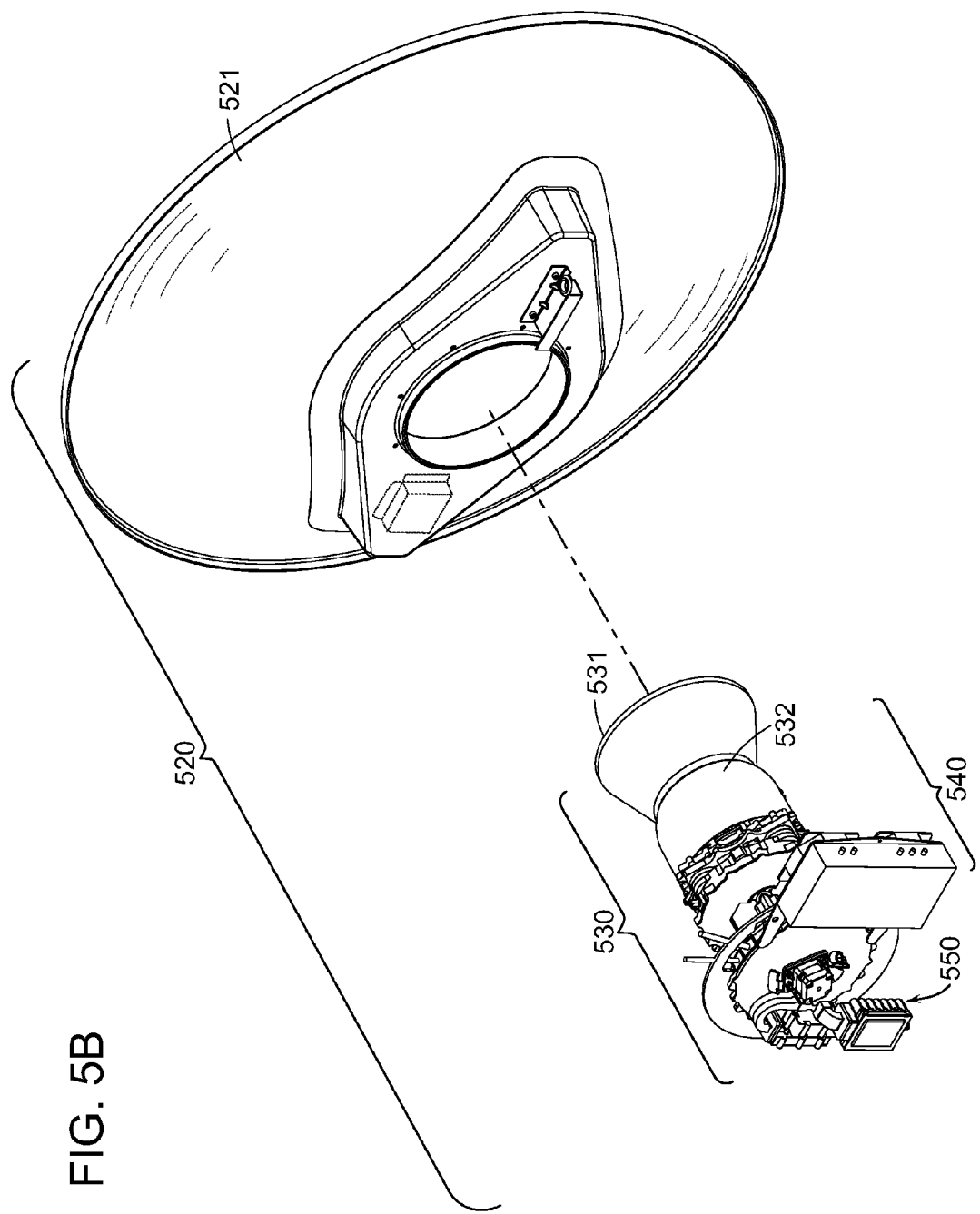

FIG. 5B is an exploded view of the antenna subassembly 520. FIG. 5B shows main reflector 521 in a rear-fed arrangement, where antenna feed assembly with integrated transceiver distributed transceiver 530 is arranged to have a rear portion located on the back side of the main reflector 521 while a front portion of feed assembly 530 protrudes to the front side of the main reflector 521 and feeds subreflector 531. The antenna feed assembly 530 includes a subreflector 531, feed horn 532, low frequency band transceiver 540, high frequency band transceiver 550. One of skill in the art will appreciate that at a high level the low band and high band transceivers of the example embodiment can be viewed as a distributed transceiver. One of skill in the art will further appreciate that the transmitter and receiver pair of a transceiver can be housed in separate modules that are arranged in a further distributed fashion and also may be referred to as a distributed transceiver.

Figure 5C:
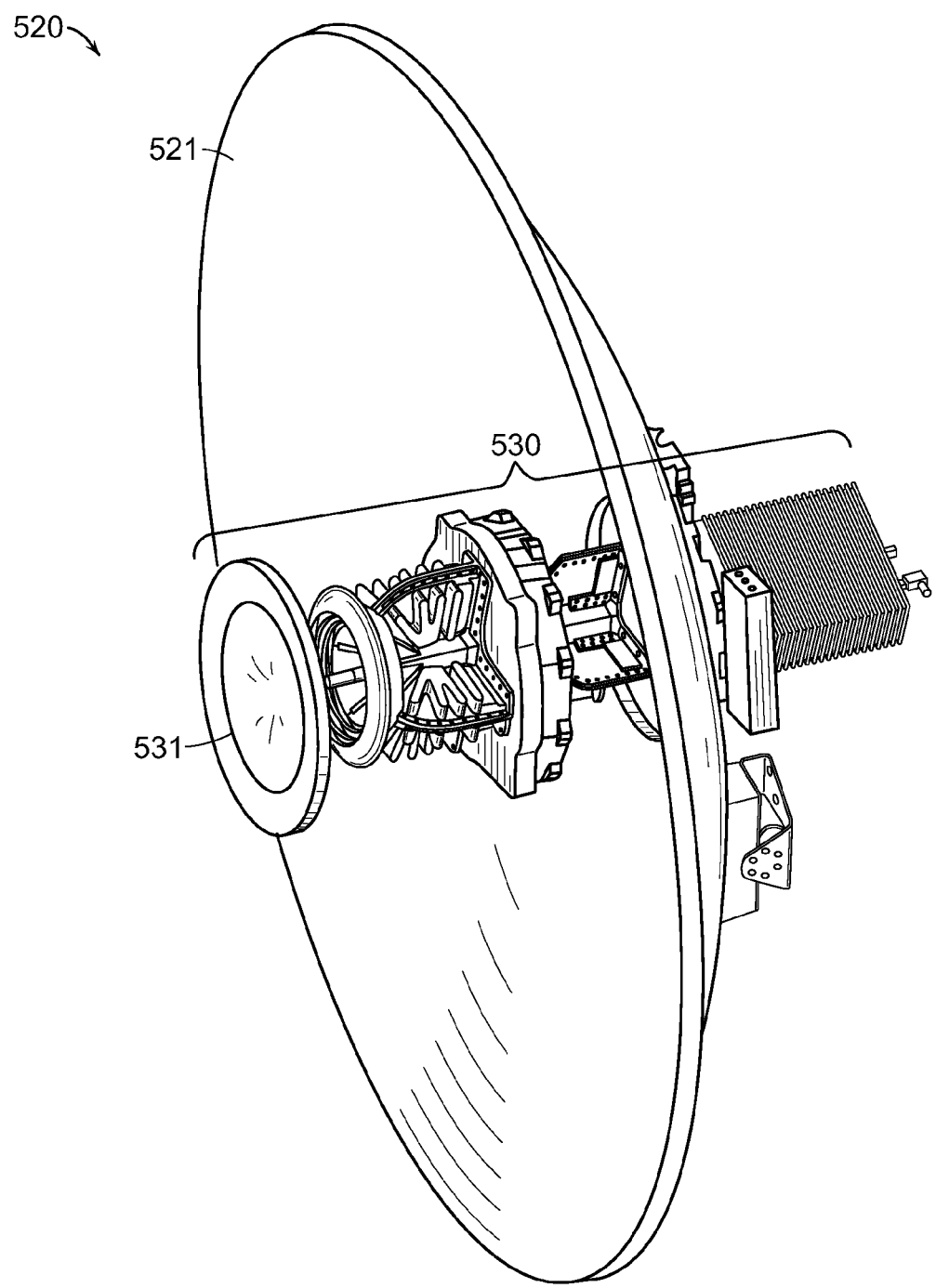

FIG. 5C is a depiction of the antenna subassembly 520 that further illustrates the antenna feed with the integrated distributed transceiver 530 arranged to protrude through the parabolic dish 521 from the rear. The antenna feed assembly 530 couples electromagnetic energy (RF or microwave signals) to and from the subreflector 531, which reflects the electromagnetic energy to main reflector 521.

Figure 5D:
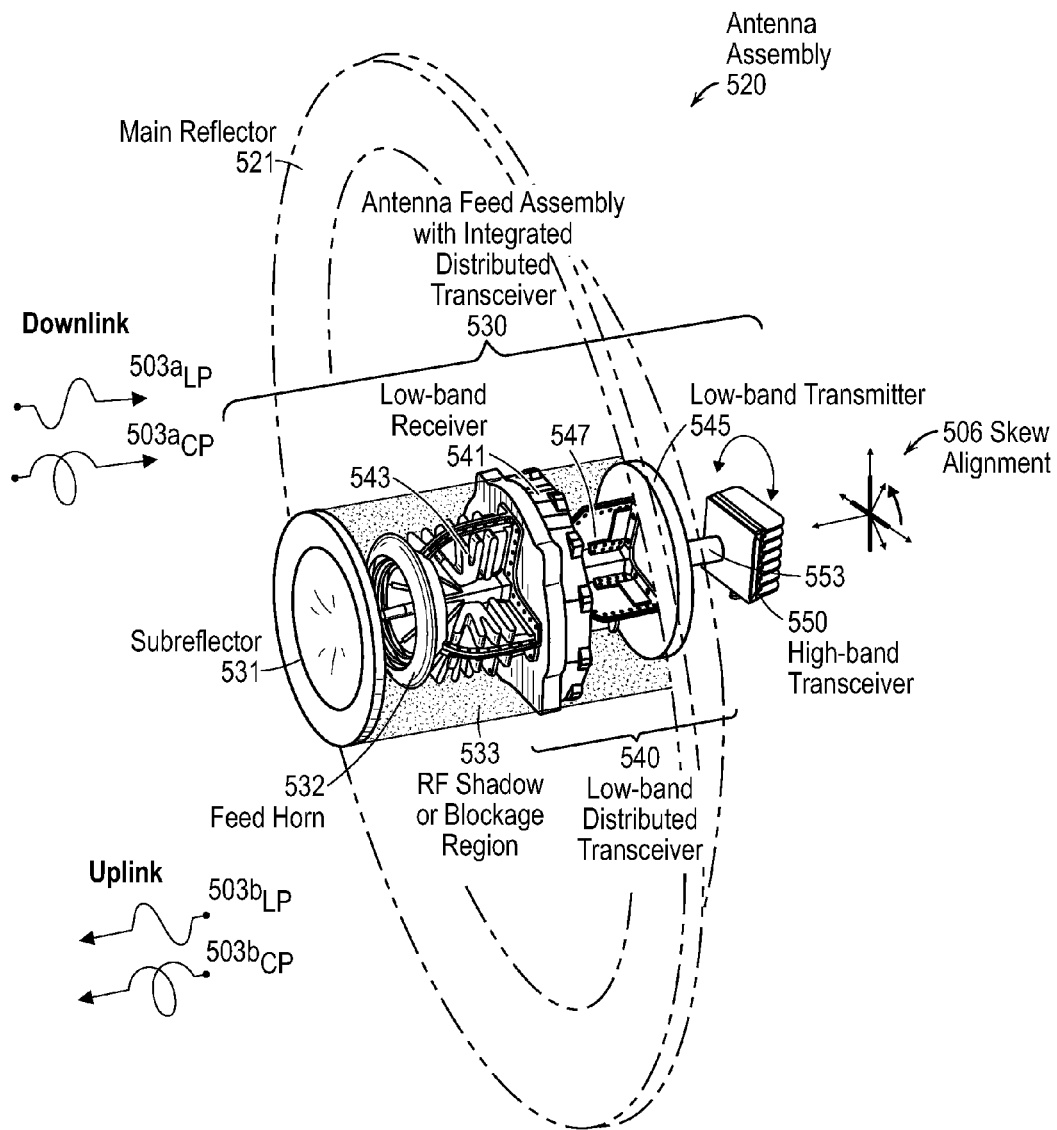

FIG. 5D is a perspective drawing of a simplified example antenna assembly 520. The antenna assembly 520 includes a parabolic dish main reflector 521 and antenna feed assembly 530 with integrated distributed transceiver. The antenna feed assembly 530 includes a subreflector 531, feed horn 532, waveguide assembly 553, high-band transceiver 550, and low-band distributed transceiver 540.

The subreflector 531 creates a blockage (or shadow) region 533 between the main reflector 521 and subreflector 531 that blocks electromagnetic energy. The low-band distributed transceiver 540 includes low-band receiver module 541 and low-band transmitter module 545, each configured to allow waveguide assembly 553 to pass through and propagate high-band signals. The low-band receiver module 541 is further arranged such that it is substantially orientated within the blockage region 533. The low-band receiver module 541 and low-band transmitter module 545 are coupled to respective low-band receiver and low-band transmitter OMTs via microwave ports arranged in a quadrature configuration. The OMTs can be integrated with the waveguide assembly 553 and can act as a multiplexer to couple the RF signals of the frequency band to the associated with the low-band receiver module 541 or low-band transmitter module 545. The microwave ports of the respective OMTs terminate in a single plane, which enables a planar interface to couple to the respective low-band receiver and transmitter, and ensures that the phase lengths of the quadrature RF paths are identical.

The antenna assembly 520 is used to receive downlink signals $503a_{LP}$, $503a_{CP}$ and transmit uplink signals $503b_{LP}$, $503b_{CP}$. For example, the receive downlink signals can be a high-band receive signal $503a_{LP}$, such as a Ku-band receive signal, or a low-band receive signal $503a_{CP}$, such as a C-band receive signal. The low-band signal $503a_{CP}$ can be a circularly polarized signal (right hand or left hand circular polarization). The high-band receive signal $503a_{LP}$ can be a linearly polarized signal. To reduce polarization mismatch loss, the high-band transceiver 550 can be mechanically rotated to match the linear polarization of the antenna assembly 520 with the downlink signal $503a_{LP}$. Such physical rotation of the high-band transceiver 550 enables skew alignment. Further, the transmit uplink signals can be a high-band transmit signal $503b_{LP}$, such as a Ku-band transmit signal, or a low-band transmit signal $503b_{CP}$, such as a C-band transmit signal. The low-band signal $503b_{CP}$ can be a circularly polarized signal (right hand or left hand circular polarization). The high-band signal $503b_{LP}$ can be a linearly polarized signal. Similarly to the receive case, the high-band transceiver 550 can be mechanically rotated to match the linear polarization of the antenna assembly 520 for the uplink signal $503b_{LP}$ to match the target satellite (skew alignment with the paired antenna).

Figure 6:
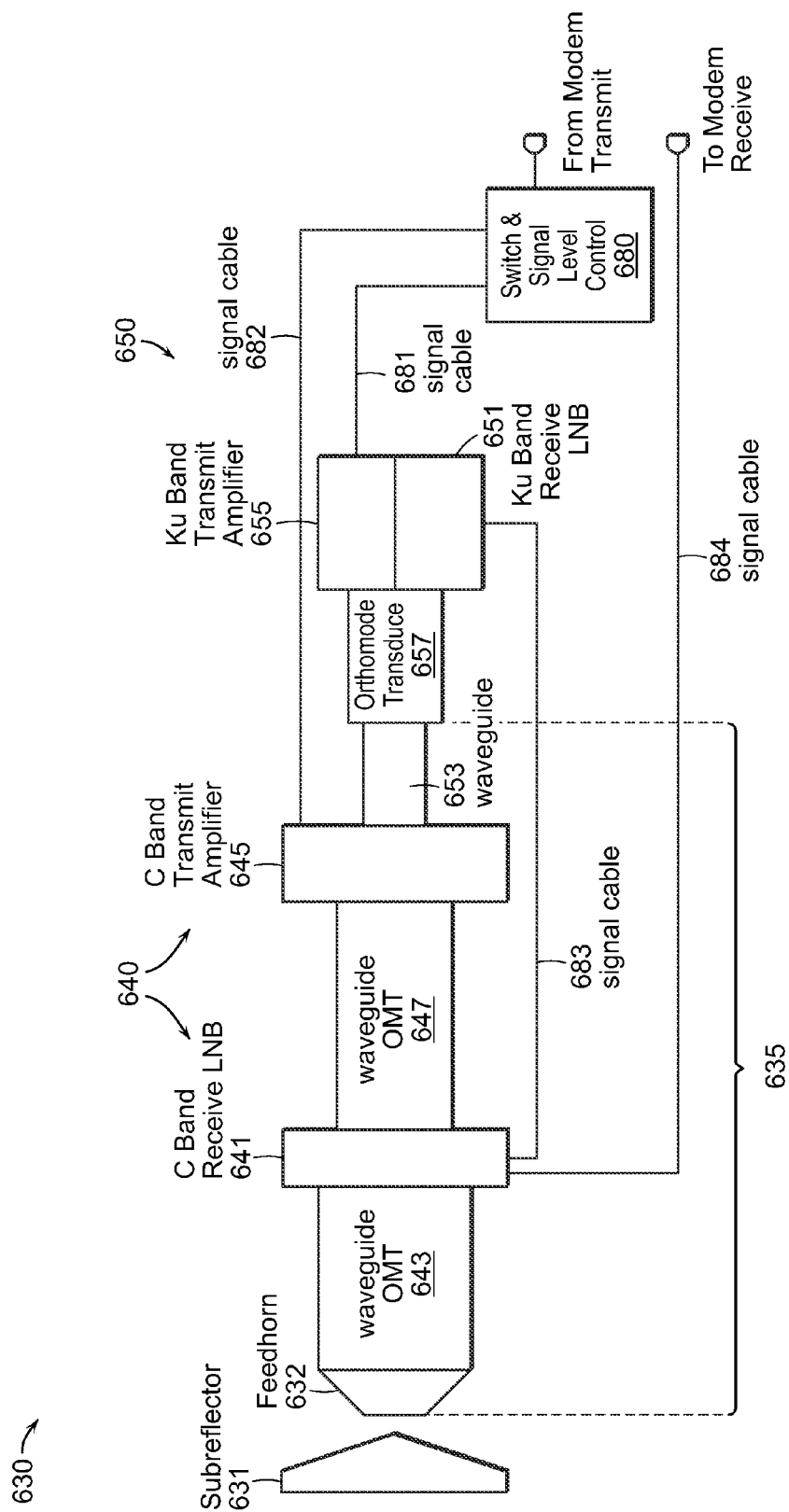
FIG. 6 is a block diagram of an example embodiment of an antenna feed and a distributed transceiver.

FIG. 6 is a block diagram of an example embodiment of an antenna feed and a distributed transceiver 630. The subreflector 631 reflects microwave energy between the waveguide feed horn 632 and the main reflector (not shown in FIG. 6). The waveguide feed horn (also referred to as simply the feed horn or horn) is an integral part of waveguide assembly 635. Waveguide assembly 635 contains structural features to perform multiple functions. Waveguide assembly 635 can be thought of functionally as a multiplexor, a passive device that enables multiplexing of separate frequency bands on the same channel, and, for example as a triplexer. The channel with respect to the example embodiment of FIG. 6 is the axis of propagation along the center of the waveguide assembly 635. The three frequency bands can be referred to as a low frequency, middle frequency, and high frequency band or range of frequencies associated with the triplexer. The structural features of waveguide assembly 635 include low frequency band orthomode transducer (OMT) 643, middle frequency band OMT 647, and high frequency band waveguide 653. The low frequency band OMT 643, middle frequency band OMT 647, and high frequency band waveguide 653 are integral parts of waveguide assembly 635. It should be understood that the low-band, mid-band and high-band can be utilized such that any one band designations can support downlink and uplink channels, while the other two bands each individually support a downlink or uplink channel. For example, the low-band and mid-band designations can be used to support C-band downlink and uplink channels, respectively, while the high-band designation is used for both downlink and uplink channels at Ku-band. Those with skill in the art will appreciate that the example embodiments presented are merely illustrative and are not intended as limiting. Under such designations, the waveguide assembly 635 (or antenna feed assembly 630) can be thought of functionally also as a quadplexer, multiplexing four frequency bands (C-band receive, C-band transmit, Ku-band receive, Ku-band transmit).

The OMTs 643, 647 are integral parts of the waveguide assembly 635. Each of the low and middle frequency band OMTs 643, 647 have four ports arranged in a quadrature configuration. Opposing pairs of the quadrature ports are used to create two orthogonal linear polarization senses for the propagating RF energy. The two orthogonal linear polarization senses can be for example, vertical and horizontal polarization senses. As will be presented in more detail below, the two orthogonal linear polarization senses can be used to create circular polarization senses.

Integrated with the waveguide assembly 635 is a distributed transceiver 640. The distributed transceiver 640 includes a receiver module 641 and transmitter module 645. The receiver module 641 is coupled to a low frequency section of waveguide assembly 635 via the OMT 643. The OMT 643 selectively couples RF energy having frequencies within the low frequency band to the low-frequency band receiver module 641.

The transmitter module 645 of distributed transceiver 640 is coupled to the OMT 647 section of the waveguide assembly 635. Waveguide OMT 647 selectively couples microwave energy having frequencies within the range of the middle frequency band from the transmitter module 645.

The waveguide assembly 635, including the integrated low and middle frequency band OMTs 643, 647, enables RF energy having frequencies in the high frequency band to propagate to the high frequency band waveguide 653. The dimensions of waveguide 653 are those of assembly 635, including OMTs waveguide with frequencies sections 643, 647. The high frequency band waveguide 653 acts as a high-pass filter, rejecting microwave energy in the lower frequency bands (e.g., frequencies of the low and middle frequency bands) and allowing microwave energy having frequencies above the cut-off frequency (e.g., frequencies within the high frequency band) to propagate. A high frequency OMT 657 is used to separate the high-frequency band microwave energy into two orthogonal linear polarized senses. The OMT 657 is coupled to a high frequency band transceiver 650. Transceiver 650 includes high frequency band receiver module 651 and high-frequency band transmitter module 655. The high frequency OMT 657 can operate as a diplexer to diplex the high band receive and transmit signals.

In the example embodiment shown in FIG. 6, transmit signals are transferred from a modem (not shown) to a switch and signal level controller module 680. From switch and signal controller module 680 the transmit signals are provided to the high frequency band transmitter module 655 via cable 681, or alternatively, depending upon the frequency of the uplink channel that the VSAT system is communicating with, to middle frequency band transmitter module 645 via cable 682. RF signals received at the high frequency receiver module 651 are down-converted from the high frequency to an intermediate frequency (IF), then output to low frequency band receiver module 641, via cable 683. The signals received at low frequency band receiver module 641 are converted down to a second IF. (The first and second IFs may be in the same frequency band). The second IF signals are transferred via signal cable 684 to the receive modem (now shown). A switch and signal control module (not shown) similar to that of switch band signal control module 680 is used in connection with low band receiver module 641 to switch between receiving RF signals having frequencies within the low and high bands (e.g., switching between receiving C-band and Ku-band) and to adjust the second IF signal level.

FIG. 7 depicts an example embodiment of a miniaturized antenna feed and integrated transceiver assembly 730. The exploded views of FIG. 7 illustrates the assembly of antenna feed and integrated distributed transceiver 730. The antenna assembly 730 is made up of subassemblies, including antenna subreflector 731, waveguide transceiver assembly 735, and high frequency transceiver 750. The waveguide transceiver assembly 735 is a waveguide assembly integrated with a distributed transceivers including a receive module 741 and transmitter module 745, each transceiver operating over a separate frequency band. The waveguide transceiver assembly 735, as show in FIG. 7B, includes antenna feed horn 732, low-band OMT 743, mid-band OMT 747, and high-band waveguide section 753. The waveguide transceiver assembly 735 can also optionally include a dielectric rod 759 arranged about the center axis of the waveguide transceiver assembly 735.

The antenna feed horn 732 acts as a transition between free space and the waveguide transmission line (waveguide) of waveguide transceiver assembly 735 to better match free-space. The waveguide OMT 743 is integrally coupled with (i.e., integrated with and coupled to) the center waveguide section 734. Center waveguide section 734 is the primary feed path through which the microwave energy of all three frequency bands of interest propagate. The low-band OMT 743 is integrally coupled with (integrated with and coupled to) waveguide section 734 and functions to selectively couple (filter) the low-band microwave signals to the low frequency receiver module 741. The low-band receiver module 741 includes a planar interface to couple electromagnetic signals from the low-band OMT 743 to the low-band receiver circuits, which can be printed circuit board (PCB) microstrip or stripline circuits, within the low-band receiving module 741. The planar interface is an interface in which all of the microwave ports share a common unitary interface plane. The low-band receiver module 741 is disk shaped, having a hole at its center, to enable the higher frequency bands of microwave energy to propagate through it unimpeded and continue along the axis of propagation of waveguide section 734. Such an arrangement of disk-shaped receiver module 741 and waveguide section 734, allows the higher frequency signals to pass through the low-band receiver module 741 without loss while minimizing low-band front-end loss and the system noise floor by reducing transmission line loss to the low-band receiver module 741. The arrangement and configuration of the disk-shaped low-band receiver module 741 improves the system gain over temperature (G/T) performance. The reduced low-band front-end loss allows a smaller sized antenna to maintain an adequate link-budget for satellite communications.

The mid-band OMT 747 is integrated with the waveguide section 734 and selectively couples the middle range frequencies from the transmitter module 745 into the antenna feed waveguide section 734 for propagation and transmission as an uplink signal 103*b* to a satellite 102 (as shown in FIG. 1A). Similar to the low-band receiver module 741, the (low-band) transmitter module 745 is disk-shaped (having a hole about a center axis) and arranged such that the higher frequency signals can pass through the transmitter module 745 unimpeded to high frequency transceiver module 750. The optional dielectric rod 759 is a preferred embodiment and is used to facilitate the transmission of the higher frequency signals within the waveguide section 734.

Figure 7A:
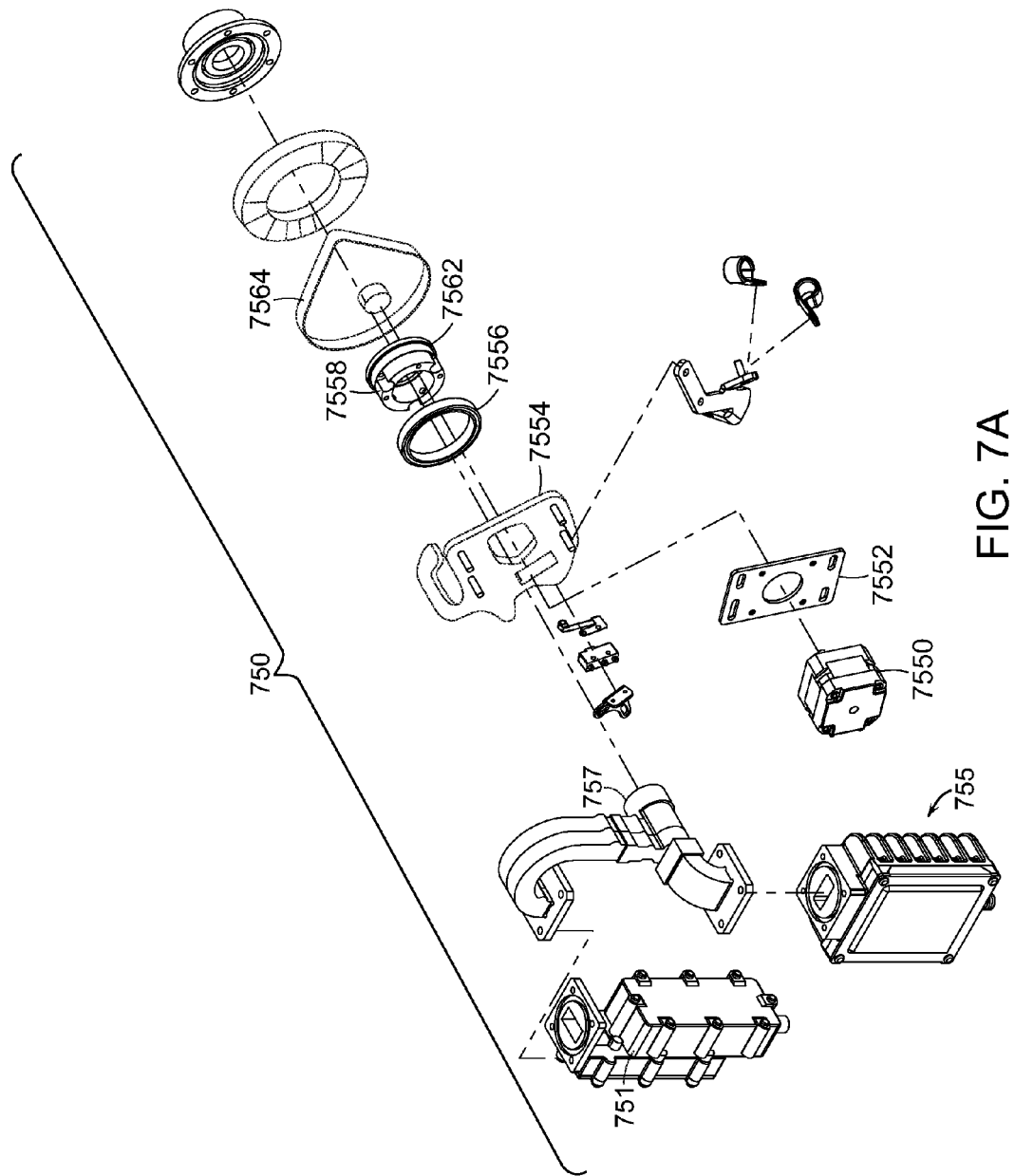

FIG. 7A is an assembly drawing of transceiver module 750. The transceiver module 750 includes high-band receiver module 751, high-band transmitter module 755, and high-band OMT assembly 757. In the example embodiment of FIG. 7, the high frequency transceiver module 750 uses two orthogonal linear polarization senses. One polarization sense is used for transmitting the uplink signal 103*b* to the satellite 102 (shown in FIG. 1A), and the other diverse linear polarization is used to receive the downlink signal 103*a* from the satellite 102. For example, the transceiver module 750 may use vertical polarization for downlinks and horizontal polarization uplinks or vice versa.

Further, in order to facilitate skew alignment, the alignment needed to match the polarization of the satellite signals, the high-band transceiver module 750, including high-band OMT, assembly 757, can be rotated mechanically relative to the orientation of the antenna subreflector 731, antenna feed horn 732, waveguide transceiver assembly 735, including the receiver module 741 and transmitter module 745. Because receiver module 741 and transmitter module 745 are mechanically and electromagnetically coupled to low-band OMT 743 and mid-band OMT 747, respectively, and the low and mid-band OMTs 743, 747 are integrated parts of waveguide assembly 735, the miniaturized antenna feed and integrated distributed transceiver 730 and main reflector (not shown in FIG. 7) are stationary relative to each other.

The transceiver module 750, as shown in assembly drawing FIG. 7A, includes a skew drive motor 75550 in addition to the high-band receiver module 751 (for example a Ku-band Low Noise Block (LNB)), high-band transmitter module 755 (for example a Ku-band Block Up Converter (BUC)), and high-band OMT 757. The transceiver module 750 further includes hardware to mount the transceiver module 750 in a rotatable configuration to the antenna assembly (for example antenna assembly 520). The hardware includes connector mounting plates 7552, 7554, drive pulley 7556, bearing assembly 7558, OMT adaptor 7562, drive belt 7564, as well as other linking hardware, such as brackets, screws, etc. The first mounting plate 7552 is used to mount the high-band transceiver assembly 750 to the antenna assembly (e.g., 520). The second mounting plate 7554 mounts the skew drive motor 7550 to the first mounting plate 7552. The skew drive motor 7550 directly drives the drive belt 7564. The drive belt 7564 rotates the drive pulley 7558 via bearing assembly 7558. OMT adaptor 7562 transitions the waveguide assembly 753 to the OMT 575. As will be understood by those of skill in the art, any suitable means for rotating the transceiver module 750 can be used, such as a direct drive motor, step motor, servo, actuator, hydraulic, pneumatic, etc. and are contemplated to be within the scope of this and other embodiments.

Figure 8A:
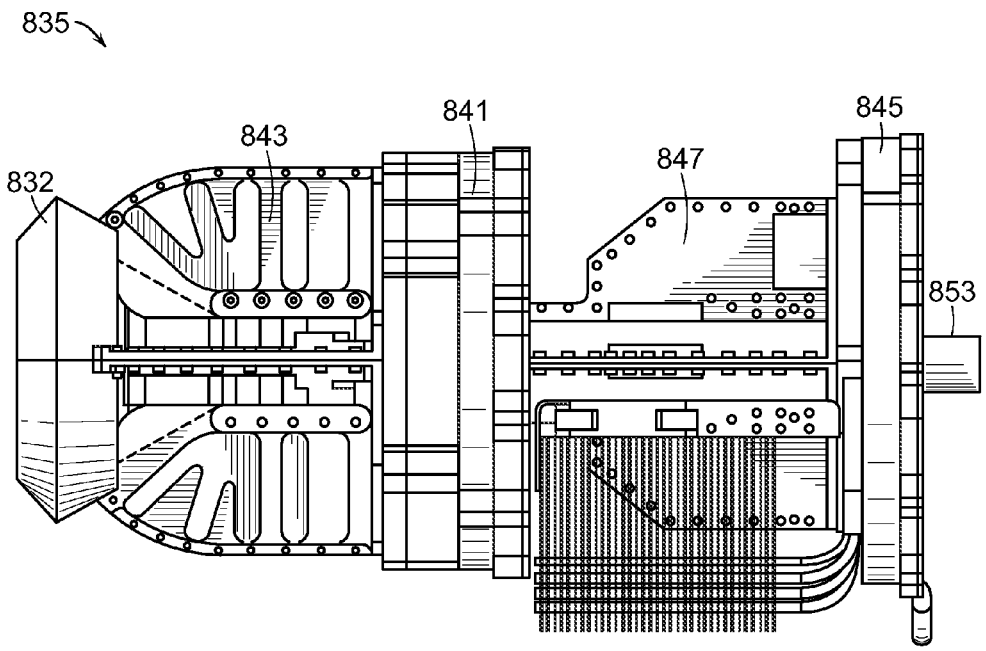
FIGS. 8A and 8B illustrate an example embodiment of an integrated distributed transceiver antenna feed.

FIG. 8A illustrates an example embodiment of an integrated distributed transceiver antenna feed 835. The integrated distributed transceiver antenna feed 835 includes a feed horn 832, low frequency OMT 843, low frequency receiver module 841, mid-frequency OMT 847, mid-frequency transmitter module 845, and high frequency waveguide section 853. FIG. 8A illustrates the distributed yet compact and highly integrated design of the integrated distributed transceiver antenna feed 835.

Figure 8B:
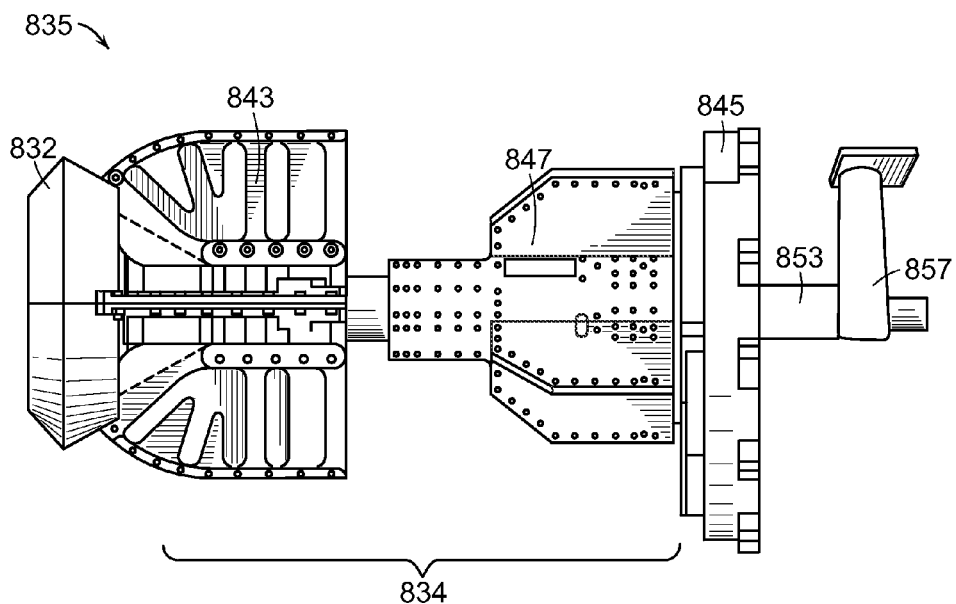

FIG. 8B is a diagram of the integrated waveguide antenna feed 835 without receiver module 841 integrated. FIG. 8B is an isolated view of the waveguide antenna feed assembly 835 including integral low and mid-band OMTs 843,847. The antenna feed horn 832 is connected to and can be manufactured in conjunction with waveguide assembly 834 and low-band OMT 843. The main path waveguide axis of waveguide assembly 834 is visible between low-band OMT 843 and mid-band OMT 847. The mid-band OMT 847 is coupled to transmitter module planar interface assembly 845. The high-band waveguide section 853 includes a waveguide choke within the interior chamber to allow only the high frequencies of interest to propagate, thus acting as a matched high pass filter prior to high frequency OMT 857.

FIGS. 9A-D depict an example embodiment of a mid-frequency OMT 947. The mid-frequency band OMT 947 functions similarly to the low frequency OMT example embodiments presented herein. The waveguide mid-band OMT 947 includes waveguide transmission paths 970*a-d*. The waveguide paths 970*a-d* are configured as sweeping arms arranged in a quadrature formation. Such an orthogonal arrangement enables circular polarization to be created more easily from opposing pairs of the quadrature ports. The waveguide mid-band OMT 947 includes multi-band port 961 and high-band port 962 arranged at opposing ends of the main propagation path, the center axis of the main waveguide section 948. A dielectric rod 959 is preferably arranged to coincide with the axis of the main propagation path. The mid-band OMT 947 has quadrature symmetry along its center axis, the main propagation path. In the example embodiment of OMT 947 shown in FIGS. 9A and 9B, the waveguide arms 970*a-d* are the same physical length and, therefore, phase matched. The equal length waveguide arms 970*a-d* a in quadrature physical arrangement (i.e., orthogonal) and contain irises. The irises are located orthogonal to each other and coupled to the main waveguide cavity. It should be understood by those of skill in the art that phase matched paths can be created using transmission line types other than waveguide, and phase matched paths of different lengths may be used.

The mid-band waveguide OMT 947 is a six port device. Multi-band port 961 can support the propagation of microwave energy having frequencies in a middle (or low) and high frequency bands, while high-band port 962 can support high frequency bands, but not low or mid-bands. The RF choke 963, which is formed by waveguide corrugations, acts as a filter and matching termination to filter out the lower frequency bands from propagating to high-band port 962 and from reflecting back to multi-band port 961. The quadrature ports 972*a-d* are used to couple transmit signals from a transmitter (for example, 845) into the mid-band OMT 947 for transmission from multi-band port 961. The ports 972*a-d* are excited in opposing pairs, for example, 972*a* and 972*c* are excited 180° out of phase with respect to one another. Likewise, ports 972*b* and 972*d* are excited 180° out of phase with respect to each other. To create circular polarization, the pairs of ports are excited 90° out of phase with respect to each other, (i.e., the port pairs). In other words, port 972*a* is excited: 90° ahead of port 972*b*; 180° ahead of port 972*c*; and, 270° ahead of 972*d*.

Figure 9A:
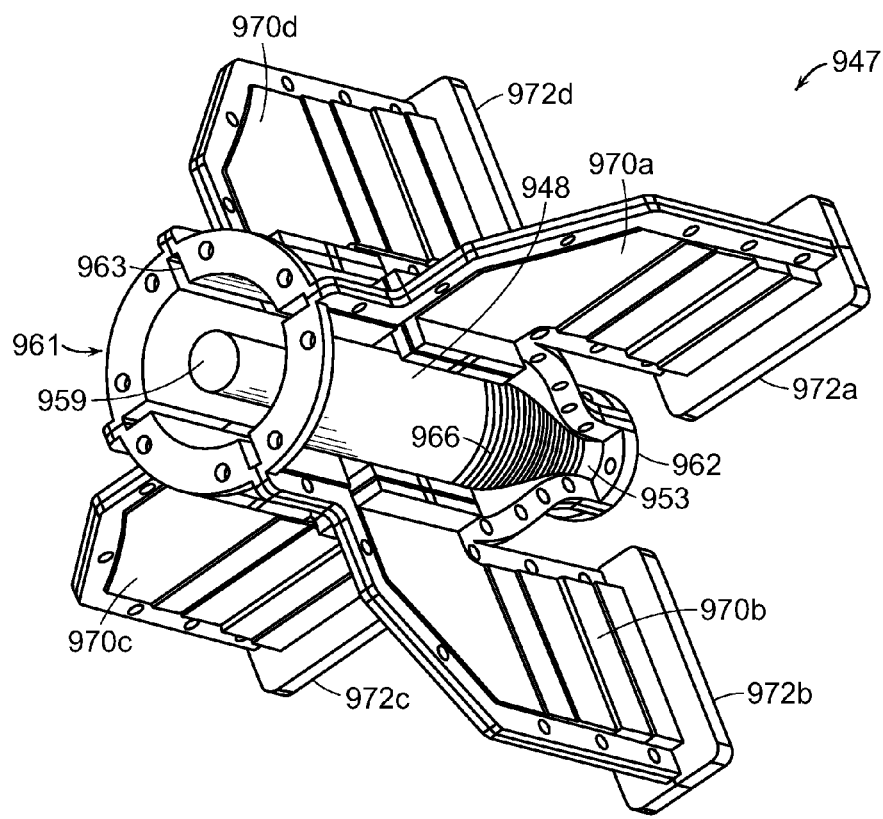
FIGS. 9A-9D depict and example embodiment of a mid-band OMT according to an example embodiment.
Figure 9B:
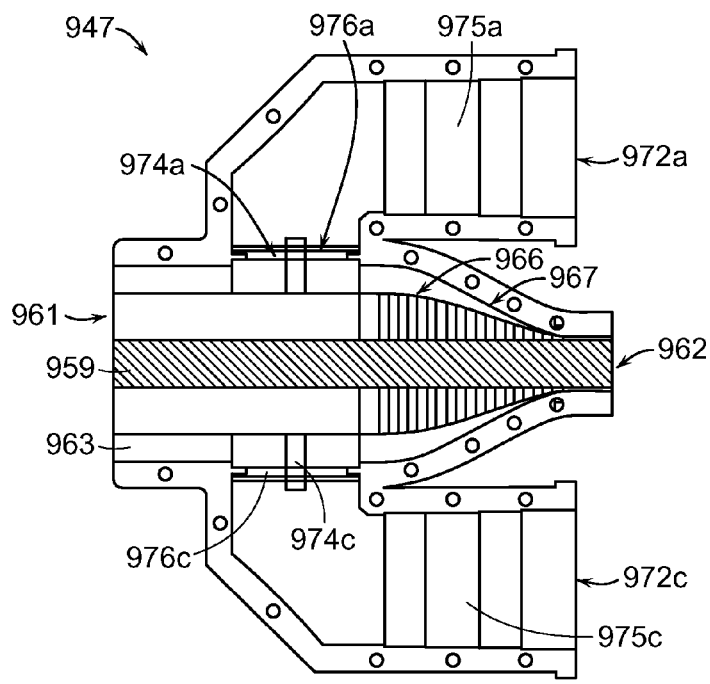

FIG. 9B shows a longitudinal cross-sectional view of a mid-band OMT 947. The mid-band OMT 947 includes grooves 963 leading from the irises 974*a,c*. The waveguide grooves 963 are long and narrow longitudinal channels that guide the propagation of orthogonal electric fields components, and, thus, enable increased orthogonal mode propagation in the main waveguide section 934. The internal port (or iris) 974*a* couples electromagnetic energy from the waveguide 934 into the mid-band OMT waveguide arm 970*a-d*. A filter 976*a* increases the isolation between the waveguide arm 970*a* and the waveguide section 934. Because the mid-band OMT 947 is a symmetrical device there are corresponding irises 974*b-d* and filters 976*b-d* for the waveguide arms 970*b-d*, respectively (not shown).

Figure 9C:
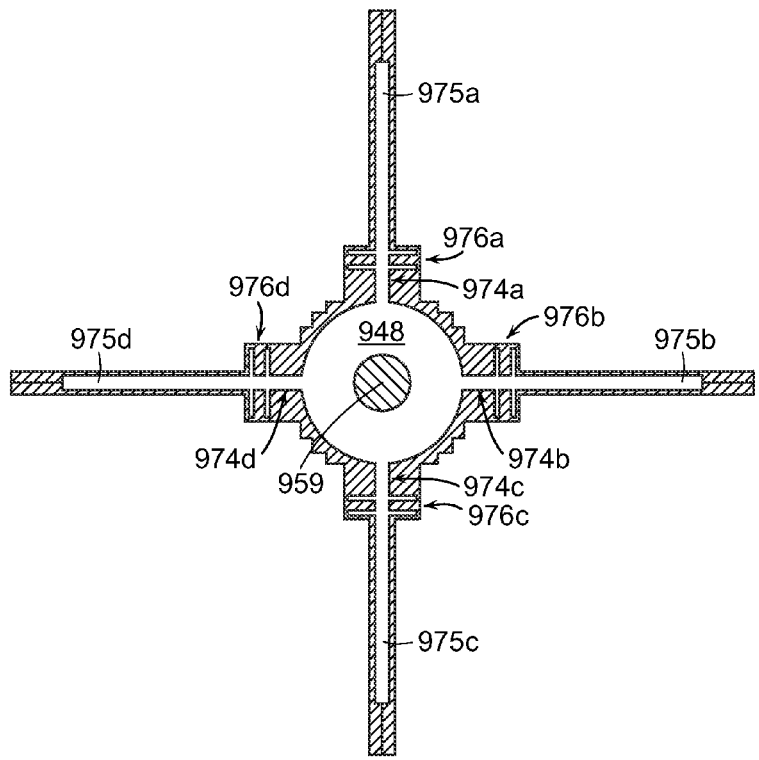

FIG. 9C shows a lateral cross-sectional view of the mid-band waveguide OMT 947. The irises 974*a-d* can be seen in FIG. 9C to be open to the side wall of main waveguide section 948. The filters 976*a-d* can be seen to be corrugated waveguide sections.

Figure 9D:
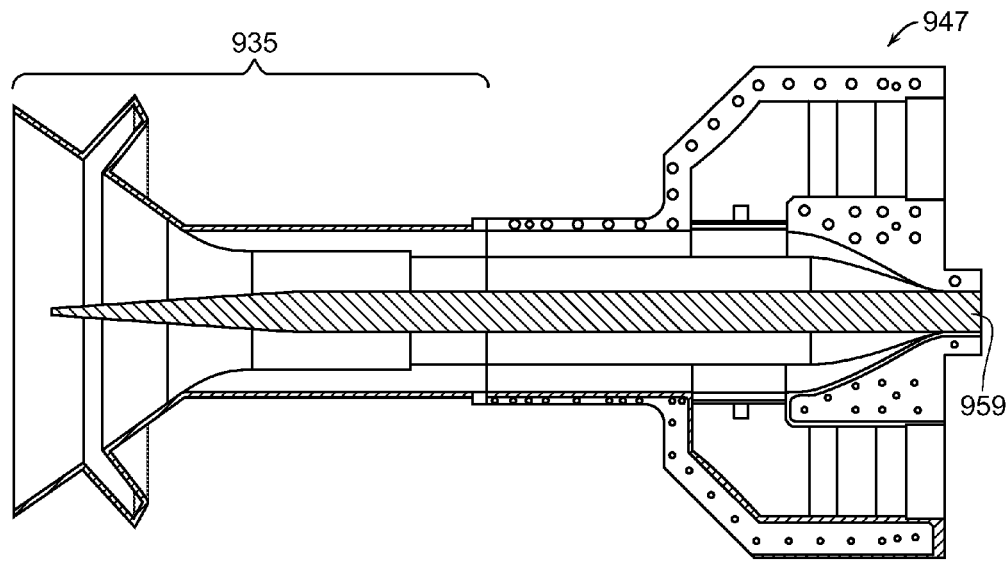

FIG. 9D shows mid-band OMT 947 coupled to a simplified example embodiment of a feed horn 935 and includes dielectric rod 959.

Figure 10:
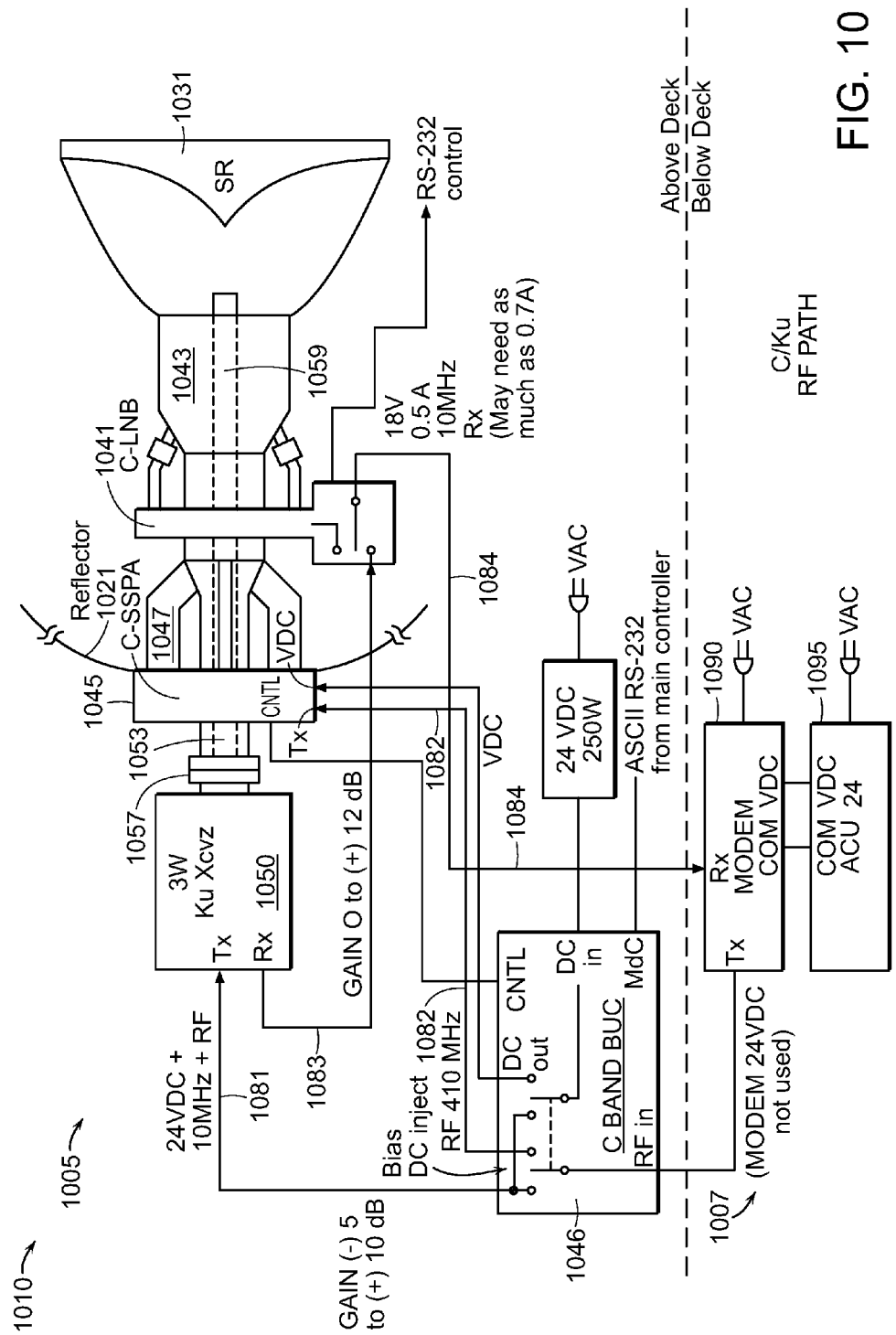
FIG. 10 is a high level schematic diagram of an example embodiment of a VSAT system with a compact multi-band antenna feed with agile polarization diversity and integrated distributed transceiver.

FIG. 10 is a high level schematic diagram of an example embodiment of a VSAT system with a compact multi-band antenna feed with agile polarization diversity and integrated distributed transceiver, including the RF, power, and control connections, as well as the relative position of the antenna feed assembly and integrated transceiver modules with respect to the main reflector 1021. With respect to the example embodiment of FIG. 10, the low, middle and high frequency bands of interest are a C-band downlink channel, C-band uplink channel, and Ku-band down/up link channels, respectively. On the front side of the main reflector 1021 is a subreflector 1031, C-band downlink/low-frequency OMT 1043, C-band downlink low noise block (LNB) 1041, C-band uplink (mid-frequency) OMT 1047. A C-band uplink solid state power amplifier (SSPA) 1045 is at or behind the front side (i.e., face) of the main reflector 1021.

The schematic diagram, FIG. 10, of antenna system 1005 includes a Ku-band (high-band) waveguide section 1053 coupled to a Ku-band OMT 1057. The Ku-band OMT 1057 is further coupled to a Ku-band transceiver module 1050. The Ku-band waveguide section 1053, Ku-band OMT 1057, and Ku-band transceiver module 1050 enable the Ku-band downlink and uplink communications. The Ku-band downlink signal received at the Ku-band transceiver module 1050 is down-converted to an IF frequency and sent via cable 1083 to the C-band LNB 1041. At the C-band LNB 1041, the received C-band downlink signals are down-converted to another second IF signal. (The first and second IF signals share a common frequency range.) The IF signal received from the Ku-band transceiver module 1050 passes through the C-band and LNB 1041. The IF signals are sent to a modem 1090 located below deck via cable 1084, depending on the mode of operation.

Uplink signals to be transmitted from the modem 1090 are first sent to a C-band block up converter (BUC) 1046. From the C-band BUC 1046, the uplink signals are then sent to either the Ku transceiver 1050 via cable 1081 or sent to C-band SSPA 1045 via cable 1082 after being converted to the C-band uplink frequency. Such an integrated design utilizes hardware reuse, further reducing system cost, weight, and size.

Figure 11:
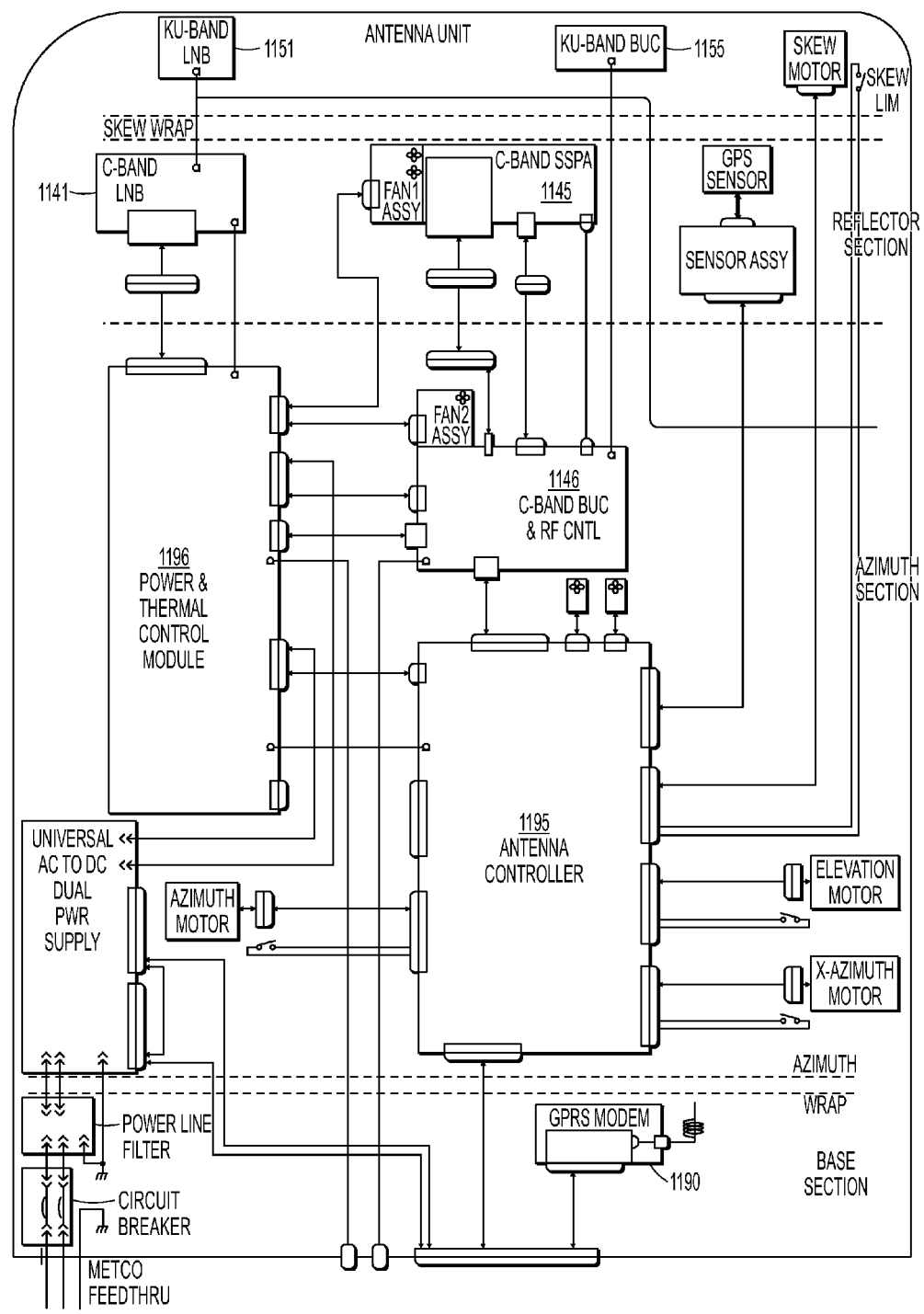
FIG. 11 is a detailed schematic diagram illustrating the electrical and RF connections between elements of an example embodiment of an antenna unit.

FIG. 11 is a detailed schematic diagram illustrating the electrical and RF connections between elements of an example embodiment of an antenna unit 110. Ku-band LNB 1151 down converts Ku-band RF signals to IF signals (IF$_{Ku-band}$) and couples the IF signals to a C-band LNB 1141. At the C-band LNB 1141, received C-band signals are down-converted to IF signals (IF$_{C-band}$) and sent to a power and thermal control module 1196. The down-converted Ku-band signals, IF$_{Ku-band}$, are passed through the C-band LNA 1141, and along with the IF$_{C-band}$ signals, are sent to the power and thermal control module 1196. The power and thermal control module 1196 is communicatively connected to antenna controller 1195. The power and thermal control module is RF coupled to the below deck modem 1007 (shown in FIG. 10). An antenna controller 1195 is communicatively coupled to a general packet radio service (GPRS) modem 1190. The uplink transmit signals originate at the below deck modem 1007 and are sent to the C-band BUC 1146. From the C-band BUC 1146, the transmit signals are sent to either the C-band SSPA 1145 or the Ku-band block up converter (BUC) 1155.

Figure 12:
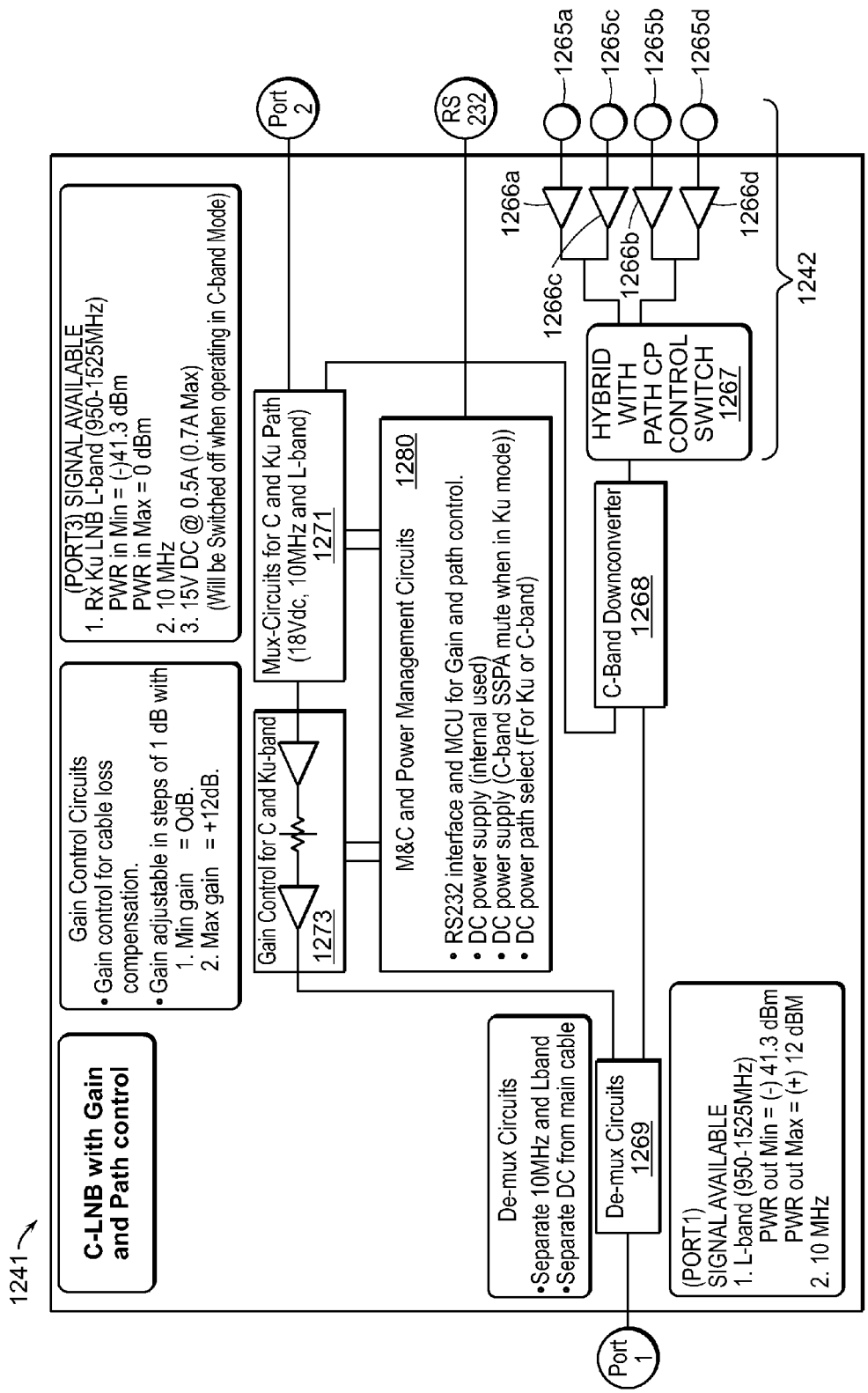
FIG. 12 is a high level schematic diagram of a low noise block (LNB) down-converter with gain control and path control.

FIG. 12 is a high level schematic diagram of a low-band low noise block (LNB) 1241 down converter with gain control and path control (C-band LNB 1241). The C-band LNB 1241 is responsible for receiving and passing IF signals from the Ku-band down converter. The C-band LNB 1241 also receives C-band downlink signals from the C-band downlink (low-band) OMT via sweeping arms coupled to the microwave ports 1265*a-d*. A microwave circuit 1242 receives the C-band downlink signals via the low-band OMT ports 1265*a-d* and amplifies each of the quadrature signals using low noise amplifiers 1266*a-d*. The microwave circuit 1242, and in particular the LNAs 1266 *a-d*, set the noise figure for the C-band LNB (low-band receiver module) 1241. Further included in microwave circuit 1242, and as will be described in further detail below, are combiners and hybrid with path circular polarization control switch 1267. Circularly polarized C-band downlink signals are output to a C-band down-converted module 1268. The C-band down-converter module 1268 down converts the C-band downlink signal to an IF signal which is output to the mux-circuit module 1271 for multiplexing with Ku-band downlink signals. The multiplexed C-band and Ku-band signals are then output from mux-circuit module 1271 to a gain control circuit 1273 for IF signal level adjustment. The gain controlled IF signal is then de-multiplexed at demultiplexing circuit 1269, which outputs the demultiplexed IF signal. A control and power module 1280 interfaces with the mux-circuit module 1271 and gain control module 1273 to provide monitoring, control, and power.

Figure 13:
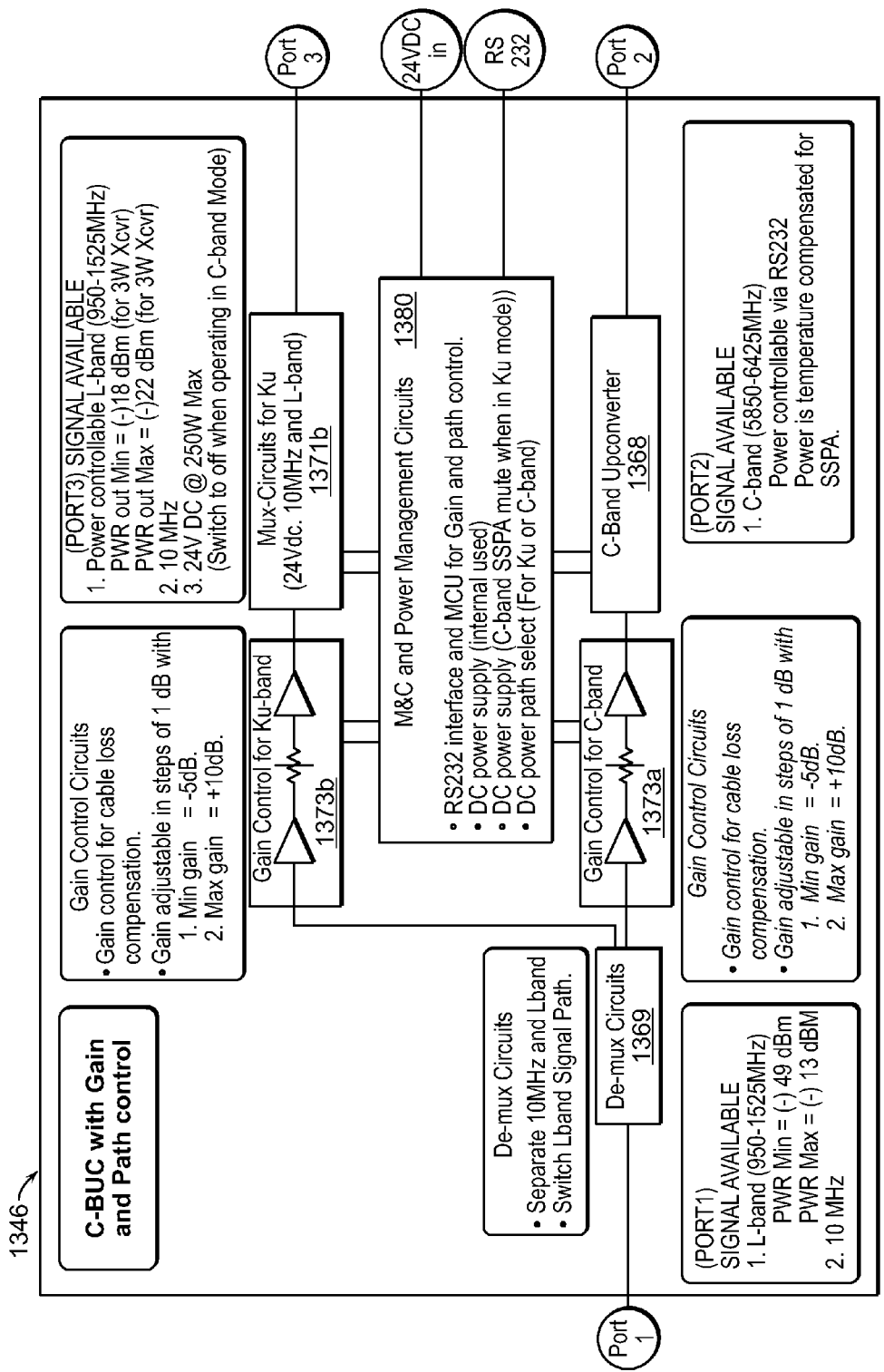
FIG. 13 is a schematic diagram of an example block up-converter (BUC) with gain and path control.

FIG. 13 is a schematic diagram of an example C-band BUC 1346 with gain and path control. The C-band BUC 1346 receives uplink signals via the below deck modem 1007 (FIG. 10). The uplink signals are de-multiplexed at the de-mux module 1369. The de-mux module 1369 produces an uplink signal for Ku-band and an uplink signal for C-band and respectively couples the uplink signals to a Ku-band gain control module 1373*b* and a C-band gain control module 1373*a*. The uplink signal for Ku-band is fed to Ku-band mux-circuits module 1371*b*. The uplink signal for C-band is fed to C-band up-converter module 1368. A control and power module 1380 interfaces with the C-band gain control module 1373*a*, C-band up-converter module 1368, Ku-band gain control module 1373*b*, and the Ku-band mux-circuits module 1371*b*. The C-band up-converter module 1368 is electromagnetically coupled to a C-band SSPA module 1045 (FIG. 10). The Ku-band mux-circuits module 1371*b* is electromagnetically coupled to a Ku-band transceiver module 1050 (FIG. 10).

Figure 14:
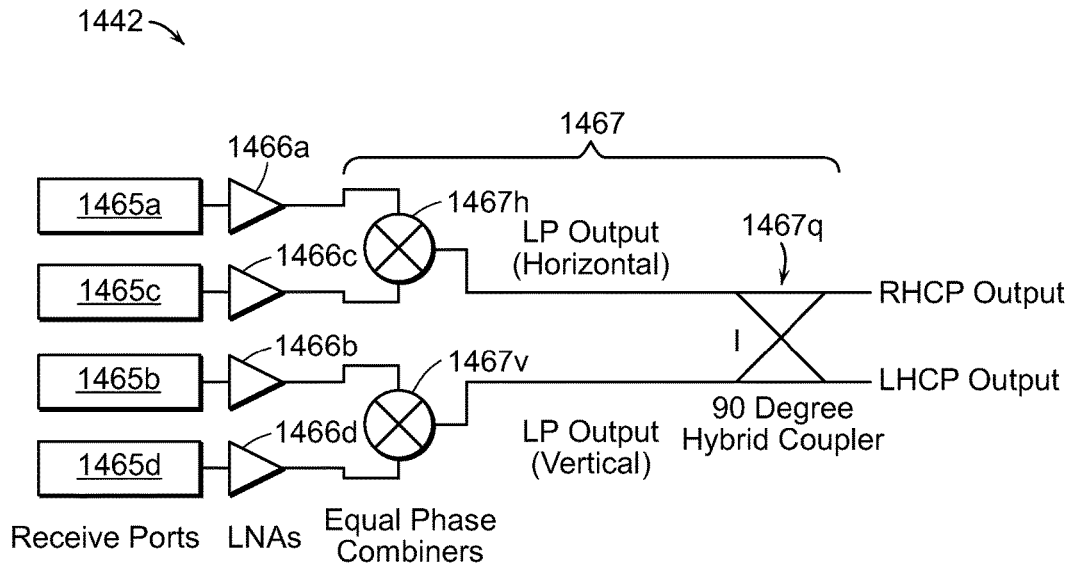
FIG. 14 is a schematic diagram of a receiver microwave (RF) polarization circuit.

FIG. 14 is a schematic diagram of a receiver microwave (RF) polarization circuit 1442. The polarization microwave circuit 1442 can be implemented using any type of transmission line (RF propagation medium), such as microstrip, stripline, or a combination thereof. Quadrature ports 1465a-d receive signals from a low frequency OMT 843 (as shown in FIG. 8A). Although other phase matched embodiments can be used, in a preferred embodiment, the microwave coupling interface is planar, that is all four quadrature ports 1465a-d interface with low-band OMT 843 in the same plane. The RF signals received at quadrature ports 1465a-d are amplified using low noise amplifiers 1466a-d, respectively. The quadrature ports 1465a-d are paired such that the pair of ports are about 180° out of phase and provide a linear polarization sense. The amplified RF signals are combined in pairs at combiners 1467h,v to produce linear polarization outputs having horizontal and vertical polarization senses. For example, quadrature port 1465a is paired with quadrature port 1465c. When signals from quadrature port 1465a and quadrature port 1465c are combined, because they are 180° approximately out of phase, the combination produces a horizontal linearly polarized signal. Similarly, pairing quadrature ports 1465b and 1465d at the combiner 1467v produces a vertical linearly polarized signal. A 90° hybrid coupler (also commonly referred to as a ring hybrid or rat-race coupler) 1467q is electromagnetically coupled to the linearly polarized outputs of the combiners 1467h,v. The linearly polarized signals are offset (delayed and advanced) 90° with respect to each other to produce a right-hand circular polarization sense output and a left-hand circular polarization sense output. The functionality of microwave polarization circuit 1442, including the combining and phase shifting of the quadrature RF signals can be done electronically (e.g., digitally using a processor), thus allowing for a dual polarization sense as well as polarization agility.

Figure 15:
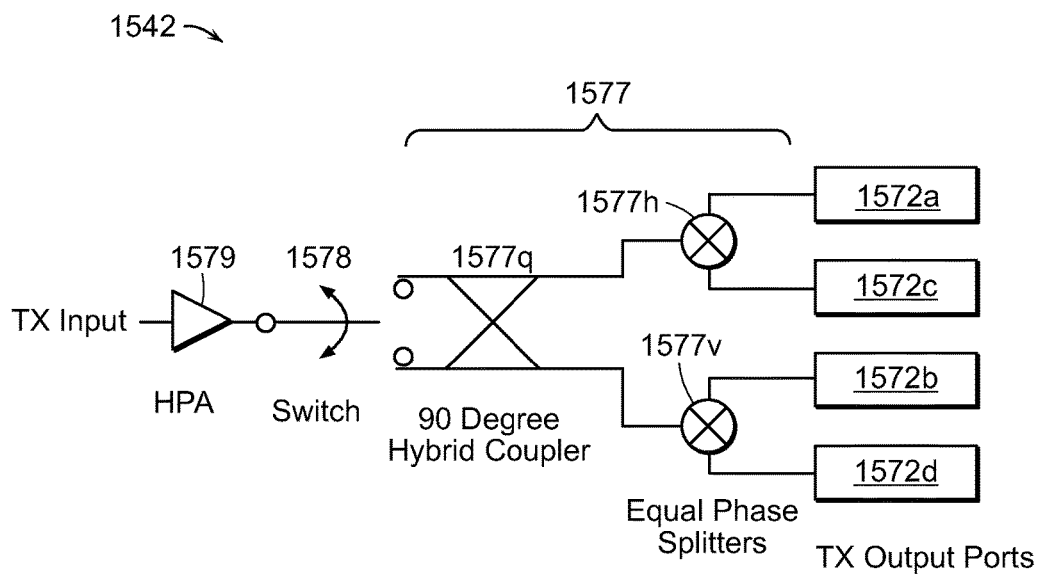
FIG. 15 is a schematic diagram of a transmitter microwave (RF) polarization circuit.

FIG. 15 is a schematic diagram of a transmitter microwave (RF) polarization circuit 1542. In an example embodiment of the present invention the transmitter microwave polarization circuit 1542 is used at a middle frequency band. Quadrature ports 1572a-d are coupled to the ports of the middle frequency OMT 947 (FIGS. 9A-D). An uplink transmit signal, for example, C-band uplink, is input into high-power amplifier 1579. A switch 1578 controls the polarization sense by selecting one port on a hybrid quadrature coupler 1577q. The hybrid quadrature coupler 1577q delays one output 90° in phase with respect to the other output. The outputs of 90° quadrature hybrid coupler are each coupled to a splitter 1577h,v. The splitters 1577h,v split their respective inputs into two equal output signals 180° out of phase with each other, thus creating a linear polarization sense output. The linear polarization sense outputs of the splitter 1577h feeds a pair of quadrature ports 1572a,c 180° out of phase from each other. Likewise, the splitter 1577v feeds the paired quadrature ports 1572b,d 180° out of phase with respect to each other. Because the 90° quadrature hybrid coupler offsets the signals feeding the splitters 1577h,v by 90°, and the paired ports, which can create a linearly polarized sense, have a 180° phase offset, a circularly polarized uplink signal is coupled to mid-band OMT 947.

Those of skill in the art will recognize that circular polarization is created through circuit 1542 such that the signal transmitted from ports 1572a-d are consecutively 90° out of phase with respect to the neighboring ports. In other words, port 1572a is 90° out of phase (leading or lagging), from the port 1572b. 1572b is 90° leading or lagging from port 1572c. Port 1572c is another 90° leading or lagging from port 1572d. Thus, the switch electronically controls whether a right-hand or left-hand polarization sense can be transmitted at the middle frequency range. The functionality of the microwave transmitter polarization circuit 1542 including the phase shifting and splitting can be performed electronically, using software executed by a processor. Alternatively, the agile polarization diversity may be processed by dedicated hardware components, such as Application Specific Integrated Circuits (ASICs) or Field Programmable Gate Arrays (FPGAs).

FIG. 16 is a table of recorded antenna performance over various frequency ranges, such as Ku-band transmit at 14 GHz to 14.5 GHz, Ku-band receive at 10.7 GHz to 12.75 GHz (together the Ku-bands are an example of a high-band), C-band transmit 5.85 GHz to 6.425 GHz (an example of a mid-band), and C-band receive at 3.625 GHz and 4.2 GHz (an example of low-band). An antenna efficiency between 54% and 82% was recorded over all frequency bands of interest.

FIG. 17 depicts the antenna gain of an example embodiment at different frequencies as a function of degrees off of bore site, bore site being at 90°. As is shown by the plot of the recorded performance of the antenna feed horn, the performance for the feed cut of 90° is within 2 dB for 35° off of boresite for the Ku-band transmit and C-band transmit frequencies. Thus, the beamwidths and the primary radiation patterns of the antenna feed horn at both uplink frequencies of interest are substantially similar.

Further example embodiments of the present invention may be configured using a computer program product; for example, controls may be programmed in software for implementing example embodiments of the present invention. Further example embodiments of the present invention may include a non-transitory computer readable medium containing instruction that may be executed by a processor, and, when executed, cause the processor to complete methods described herein. It should be understood that elements of the block and flow diagrams described herein may be implemented in software, hardware, firmware, or other similar implementation determined in the future. In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random access memory (RAM), read only memory (ROM), compact disk read only memory (CD-ROM), and so forth. In operation, a general purpose or application specific processor loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments of the invention.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. An antenna assembly, comprising:
an antenna feed assembly; and
a first transceiver electromagnetically coupled to receive and transmit ports of a first orthomode transducer, a receiver module and a transmitter module of the first transceiver module being disk-shaped and each having a center hole through which a longitudinal axis passes;
a second transceiver electromagnetically coupled to receive and transmit ports of a second orthomode transducer, the first and second orthomode transducers electromagnetically coupled to the antenna feed assembly to facilitate propagation of electromagnetic energy along the longitudinal axis common to the first orthomode transducer, the second orthomode transducer and the antenna feed assembly;
the antenna assembly being configured and arranged to maintain a fixed relationship between the first orthomode transducer and the antenna feed assembly, and to facilitate a rotation of a spatial orientation of the first orthomode transducer and the antenna feed assembly relative to the second orthomode transducer to adjust a skew alignment.

2. The antenna assembly of claim 1, wherein the first and second transceivers operate over first and second radio frequency (RF) bands, respectively.

3. The antenna assembly of claim 2, wherein the first RF band includes a range of substantially Ku-band frequencies and wherein the second RF band includes a range of substantially C-band frequencies.

4. The antenna assembly of claim 2, further comprising a dielectric rod configured to facilitate propagation of electromagnetic energy having a frequency within the first RF band within the antenna feed assembly.

5. The antenna assembly of claim 1, further comprising a main reflector arranged in a stationary orientation relative to the second transceiver.

6. The antenna assembly of claim 5, further comprising a subreflector, configured to reflect electromagnetic energy propagating between the antenna feed assembly and the main reflector, the subreflector creating an RF shadow region, in which the second transceiver is at least partially located between the subreflector and the main reflector.

7. The antenna assembly of claim 6, wherein the second transceiver is arranged such that a lateral cross-section of the second transceiver is entirely located within the RF shadow region.

8. The antenna assembly of claim 1, wherein the first transceiver is arranged to rotate to enable linear polarization alignment with a paired antenna distal from the antenna assembly.

9. The antenna assembly of claim 1, further comprising transmit and receive planar coupling interfaces associated with at least one of the first and second transceivers.

10. The antenna assembly of claim 9, further comprising a sub-reflector, configured to reflect electromagnetic energy propagating between the antenna feed assembly and the main reflector, the subreflector creating an RF shadow region between the subreflector and the main reflector, the transmit and receive planar coupling interfaces being located within the RF shadow region and having lateral dimensions that do not protrude from the RF shadow region.

11. A method of transitioning propagating microwave energy between a transmission line and free-space using an antenna assembly, the method comprising:
propagating microwave energy using an antenna feed assembly;
coupling the propagating microwave energy to first and second transceivers, the first transceiver being electromagnetically coupled to receive and transmit ports of a first orthomode transducer, a receiver module and a transmitter module of the first transceiver module being disk-shaped and each having a center hole through which a longitudinal axis passes, the second transceiver being electromagnetically coupled to respective receive and transmit ports of a second orthomode transducer, the first and second orthomode transducers being electromagnetically coupled to the antenna feed assembly to facilitate propagation of electromagnetic energy along a longitudinal axis common to the first orthomode transducer, the second orthomode transducer and the antenna feed assembly; and
rotating a spatial orientation of the second orthomode transducer relative to the first orthomode transducer and the antenna feed assembly, the antenna assembly being configured and arranged to maintain a fixed relationship between the first orthomode transducer and the antenna feed assembly.

12. The method of claim 11, wherein the propagating microwave energy is over first and second radio-frequency (RF) bands, the first and second RF bands being the operational bands or within the operational bands of interest of the first and second transceivers, respectively.

13. The method of claim 12, wherein the propagating microwave energy of the first RF band includes of a range of substantially Ku-band frequencies and wherein the propagating microwave energy of the second RF band includes a range of substantially C-band frequencies.

14. The method of claim 12, further comprising facilitating the propagating microwave energy of the first RF band within the antenna feed assembly through use of a dielectric rod.

15. The method of claim 11, further comprising maintaining a stationary orientation of a main reflector relative to the second transceiver.

16. The method of claim 15, further comprising:
reflecting electromagnetic energy propagating between the antenna feed assembly and the main reflector using a subreflector, the subreflector creating an RF shadow region; and
transmitting or receiving using the second transceiver, the second transceiver being at least partially located within the RF shadow region.

17. The method of claim 16, wherein the transmitting or receiving is performed by a transmitter and receiver, respectively, composing the second transceiver, the second transceiver having a lateral cross-section located entirely within the RF shadow region.

18. The method of claim 11, wherein rotating mechanically an orientation of the first transceiver relative to the second transceiver further includes rotating the first transceiver with respect to a linear polarization alignment with a paired antenna distal from the antenna assembly.

19. The method of claim 11, wherein coupling the propagating microwave energy to at least the second transceiver is performed at transmit and receive planar coupling interfaces.

20. The method of claim 19, further comprising:
reflecting electromagnetic energy, propagating between the antenna feed assembly and the main reflector by using a subreflector, the subreflector creating an RF shadow region; and
transmitting and receiving using the second transceiver, the transmit and receive planar coupling interfaces being located in the RF shadow region and having maximum lateral dimensions no greater than corresponding lateral dimensions of the RF shadow region.

* * * * *